United States Patent
Schwend et al.

(10) Patent No.: US 6,748,058 B1
(45) Date of Patent: Jun. 8, 2004

(54) CALLER IDENTIFICATION SYSTEM WITH ANNOUNCEMENT CAPABILITY

(75) Inventors: Peggy S. Schwend, Phoenix, AZ (US); Martin R. Marks, Phoenix, AZ (US); Brent V. Bell, Tempe, AZ (US); Douglas F. Reynolds, Phoenix, AZ (US); Gloria E. Davy, Phoenix, AZ (US)

(73) Assignee: Qwest Communications Int'l., Inc., Denver, CO (US)

( * ) Notice: Subject to any disclaimer, the term of this patent is extended or adjusted under 35 U.S.C. 154(b) by 0 days.

(21) Appl. No.: 09/387,217

(22) Filed: Aug. 31, 1999

(51) Int. Cl.[7] .......................... H04M 1/64; H04M 1/56; H04M 3/42
(52) U.S. Cl. ............................ 379/88.21; 379/201.11; 379/142.06; 379/207.15
(58) Field of Search ..................... 379/142.02, 142.04, 379/142.06, 127.01, 221.08, 221.09, 221.1, 221.11, 221.12, 67.1, 93.23, 142.17, 201.11, 207.15, 207.13, 207.16

(56) References Cited

U.S. PATENT DOCUMENTS

| | | | | | |
|---|---|---|---|---|---|
| 4,899,358 | A | * | 2/1990 | Blakley | 379/142.01 |
| 4,924,496 | A | * | 5/1990 | Figa et al. | 379/142.06 |
| 5,533,106 | A | * | 7/1996 | Blumhardt | 379/142.02 |
| 5,781,613 | A | * | 7/1998 | Knuth et al. | 379/142.02 |
| 5,796,806 | A | * | 8/1998 | Birckbichler | 379/131 |
| 5,920,614 | A | * | 7/1999 | Osman et al. | 379/140 |
| 6,104,787 | A | * | 8/2000 | Paris | 379/93.01 |
| 6,178,232 | B1 | * | 1/2001 | Latter et al. | 379/142.02 |
| 6,233,325 | B1 | * | 5/2001 | Frech et al. | 379/142.02 |
| 6,332,021 | B2 | * | 12/2001 | Latter et al. | 379/142.01 |

FOREIGN PATENT DOCUMENTS

JP 01-195748 * 8/1989 ............ H04M/1/64

OTHER PUBLICATIONS

Ameritech, Privacy Manager, Nov. 13, 1998 (see IDS).*
Ameritec Privacy Manager Powerpoint Presentation Slides (From IDS).*
Ameritech Privacy Manager Powerpoint Presentation Slides, Nov. 13, 1998 (from IDS).*
Ameritech Privacy Manager Powerpoint Presentation Slides, Nov. 13, 1998.*
1. News Release Downloaded From www.prnewswire.com on Nov. 2, 1999.
2. Ameritech User Guide for Privacy Manager with Sales Screener, Nov. 13, 1998.
3. Ameritech Privacy Manager Powerpoint Presentation Slides, Nov. 13, 1998.

* cited by examiner

Primary Examiner—Fan Tsang
Assistant Examiner—Simon P. Sing
(74) Attorney, Agent, or Firm—Robert G. Crouch; Marsh Fischmann & Breyfogle LLP

(57) ABSTRACT

Disclosed is a caller identification system that provides unblocking or audible identification on telephone calls from calling parties having blocked or unknown numbers. Calling parties from blocked numbers are given the option of unblocking their name and telephone number for the current call, or to record their name for delivery to the caller ID subscriber. Calling parties from unknown numbers are given the option of recording their name for audible identification. The system provides an audibly distinct ring on a caller ID subscriber's telephone and visually displays a special message on a caller ID subscriber's visual display unit to alert the subscriber that the incoming telephone call will be audibly announced, since the telephone number and possibly the name of the calling party are not available to the caller identification system.

24 Claims, 13 Drawing Sheets

CALLER IDENTIFICATION SYSTEM WITH ANNOUNCEMENT CAPABILITY

FIELD OF THE INVENTION

This invention pertains to caller identification systems, and more particularly, to a caller identification system which audibly and visually announces an incoming telephone call when the telephone number and possibly the name of the calling party are unavailable to the caller identification system.

BACKGROUND OF THE INVENTION

Telephone users who subscribe to a caller identification service, commonly referred to as "caller ID service," do so because they want to know who is trying to call them on each and every incoming telephone call. Caller ID subscribers desire to know in advance who is calling them in order to make an informed decision about answering the call. They want to be able to answer calls from parties that they know if it is convenient for them to talk to the party at the present time. If it is not a convenient time, they can choose to not talk the known party. And finally, caller ID subscribers want to be able to choose whether or not to answer calls from parties that they do not know.

However, many telephone calls received by caller ID subscribers are from calling parties who have blocked their name and telephone number from being revealed to the caller ID subscriber by the caller identification system. In such cases, the caller ID subscriber's visual display unit does not show the name or number of the calling party. This is very frustrating to the caller ID subscriber, because this defeats the very purpose for which the caller ID subscriber secured the caller ID service in the first place: to know the name and number of all parties calling them.

This situation is also frustrating to the calling party. When a calling party who has blocked their name and telephone number calls a caller ID subscriber who has turned on the blocked call rejection feature, the calling party receives a recorded message indicating that the caller ID subscriber does not accept blocked telephone calls. In such situations, if the calling party wants to speak to the caller ID subscriber, the calling party has to take certain steps to unblock his telephone number from the caller identification system. Typically, such steps may entail the calling party hanging up, picking the handset up again, entering a sequence of command symbols or numbers through their telephone keypad, and then redialing the desired party.

SUMMARY OF THE INVENTION

In view of the foregoing problems and difficulties, it is an aspect of the present invention to provide an improved caller identification system that audibly announces to a caller ID subscriber that an incoming call is from a calling party whose telephone number and possibly their name is not available to the caller identification system.

It is another aspect of the present invention to provide an audibly distinct ring on a caller ID subscriber's telephone to alert the subscriber that the incoming telephone call will be audibly announced, since the telephone number and possibly the name of the calling party is not available to the caller identification system.

Yet another aspect of the present invention is to visually display a special message on a caller ID subscriber's visual display unit to alert the subscriber that the incoming telephone call will be audibly announced, since the telephone number and possibly the name of the calling party is not available to the caller identification system.

Still another aspect of the invention is to provide an opportunity for a calling party, whose telephone number and possibly their name is not available to the caller identification system and who is calling a caller ID subscriber, to unblock the calling party's name and telephone number for the current call only without having to hang up and redial.

These aspects and additional advantages are realized in the present invention which operates within a telephone system network within a Local Calling Area (LCA) and the local central offices within the LCA. The telephone system network utilizes switches operating within a Signaling System 7 protocol network that supports Advanced Intelligent Network (AIN) capabilities. The central offices servicing the caller ID subscribers are digital electronic switching systems of a suitable type, such as a 5ESS from Lucent, or a DMS100 from Nortel, or an analog electronic switching system of a suitable type, such as a 1AESS from Lucent. The central offices must also be equipped with AIN Terminating Attempt Triggers (TAT), which are equipped against the caller ID subscriber's line in the serving central office.

The serving central offices identify incoming telephone calls from various call sources, and determine whether or not the incoming call's directory number is available. The serving central offices also identify the directory number that the call is directed to. If a termination attempt trigger is equipped against the directory number that the call is directed to, the serving central office suspends connecting the call and sends a query to a database within a services control point. The services control point provides call processing instructions for calls to a caller ID subscriber who has a call processing record equipped with the caller ID service. An intelligent peripheral provides audio announcements, collects digit input from a telephone keypad, and connects the calling party to the caller ID subscriber when directed to do so by the services control point. The intelligent peripheral is connected to the serving central office through primary rate Integrated Services Digital Network (ISDN) trunks. The intelligent peripheral is accessed through direct inward dial telephone numbers that are route indexed to the intelligent peripheral.

The caller identification system of the present invention, in addition to allowing caller ID subscribers to receive calls where the telephone number and possibly the name of a calling party are available to the caller identification system, provides unblocking or audible identification on telephone calls from calling parties having blocked or unknown numbers. Calling parties from blocked or unknown numbers will hear an announcement, such as "The number you are calling does not accept unidentified calls." This announcement may be followed by other announcements based on whether the unidentified call is blocked or unknown. A blocked call, also referred to as a private call, is a call from a number that is available to the telephone switching system but has been marked private at the request of the calling party, and thus cannot be delivered to the caller ID subscriber. An unknown call is a call from a number that is not available to the telephone switching system for some other reason. For example, some long distance carriers may not pass along the ten digits of the calling party's telephone number. In addition, some operator calls or collect calls may also not pass along the calling party's ten digit telephone number. Also, auto dialers used by telemarketing companies often prevent the ten digits of the calling number from being passed along.

In the present invention, calling parties from blocked numbers are given the option of unblocking their name and telephone number for the current call, or to record their name for delivery to the caller ID subscriber. Calling parties from unknown numbers are given the option of recording their name for audible identification.

If the calling party presses a specified digit on the telephone keypad, such as a zero (0) during or immediately after the announcement(s), the signal sent from the telephone keypad causes the caller identification system to replay the announcement(s). If the blocked or private calling party presses another specified digit on the telephone keypad, such as a two (2), or waits, or if the unknown calling party presses another specified digit, such as a one (1), or waits, the signal sent causes the caller identification system to play announcements instructing the calling party to say the calling party's name after the tone, and then press another specified digit, such as the pound (#) key. If the calling party records their name, the caller identification system will place the calling party on hold and attempt to contact the caller ID subscriber by outdialing the caller ID subscriber's directory number. This triggers a distinctive ring in the caller ID subscriber's telephone that is different from the normal ring for incoming calls. If the caller ID subscriber's telephone is answered, the caller identification system then attempts to deliver the audible identification.

If the blocked or private calling party presses another specified digit on the telephone keypad, such as a one (1), the caller identification system will unblock the calling party's name and telephone number for the current call only, and the call will be forwarded to the caller ID subscriber's telephone for normal call processing. If any other digit is pressed, the calling party will be informed that the digit that was pressed is not an option and to please try again. The calling party is given three attempts to enter a correct digit. After three incorrect attempts, the caller identification system will play a termination announcement. If the caller ID subscriber has a voice messaging service, the calling party will be forwarded to that voice messaging service.

If the calling party elects not to use the record option for unknown or blocked numbers, or the unblock option for blocked or private numbers, the caller identification system will play a termination announcement and terminate the telephone call. If the caller ID subscriber has a voice messaging service, the caller identification system will play a termination announcement indicating that the call will be sent to a voice messaging service, and will forward the calling party to the caller ID subscriber's voice messaging service.

If the calling party's name has been recorded, the caller identification system places the calling party on hold and outdials to the caller ID subscriber's directory number. The caller ID subscriber's telephone rings with a distinctive ring to identify that the call is from the caller identification system, and the caller ID subscriber's visual display unit will display a special message, and special symbols, such as "000-000-0000", or no calling number information, depending upon the individual caller ID subscriber's visual display unit.

If the caller ID subscriber does not have a voice messaging service and the call is answered, the caller identification system plays an announcement indicating that the call is from an unidentified calling party, and requests that the caller ID subscriber press a specified digit, or any digit within a specified range of digits, on the telephone keypad. If the call is answered but the caller ID subscriber does not press any key, or a specified digit or any digit within a specified range of digits on the telephone keypad is pressed, the caller identification system will inform the calling party that there was no response, and that the calling party will be connected to the telephone answering device. The calling party will then be connected to the subscriber's line to allow the calling party to leave a message on the telephone answering device.

If the caller ID subscriber presses a specified digit on the telephone keypad, such as the one (1) key, the caller identification system plays an announcement indicating that the caller identification system is calling, such as "You have a call from . . . " and then plays the recorded name. The caller ID subscriber is then given the choice of accepting the call by pressing a specified digit on the telephone keypad, such as the one (1) key, or pressing another specified digit on the telephone keypad, such as the two (2) key, to indicate that the caller ID subscriber is not available. If the caller ID subscriber accepts the call, the calling party will be connected with the caller ID subscriber. If the caller ID subscriber rejects the call, the calling party will be informed that the caller ID subscriber could not be reached and the call will be terminated.

If the caller ID subscriber has a voice messaging service, the caller identification system skips the initial press the one (1) key announcement and plays an announcement indicating that the caller identification system is calling, such as "You have a call from . . . " and then plays the recorded name. The caller ID subscriber is then given the choice of accepting the call by pressing a specified digit on the telephone keypad, such as the one (1) key, or pressing another specified digit on the telephone keypad, such as the two (2) key, to indicate that the caller ID subscriber is not available. If the caller ID subscriber accepts the call, the calling party will be connected with the caller ID subscriber. If the caller ID subscriber rejects the call, the calling party will be informed that the subscriber could not be reached and that the calling party will be sent to the caller ID subscriber's voice messaging service. The calling party is then forwarded to the caller ID subscriber's voice messaging service to leave a message.

The caller identification system does not distinctively ring on a line equipped for custom ringing, but rings with the normal ring cadence for the directory number called. Audibly identified calls from the caller ID service on a line with custom ringing will display the special message and the special symbols, such as "000-000-0000", or no calling number information, depending on the individual caller ID subscriber's visual display unit.

The caller ID subscriber has the ability to control or modify the subscriber's caller ID service by dialing a number and gaining access to a voice response system and interact with voice prompt menus. The caller ID subscriber can utilize these menus to turn caller ID service on or off, and can also establish, or change, a four digit privileged caller code. The caller ID subscriber can give the privileged caller code to friends, family members, or to any other individuals he/she chooses. If one of these individuals calls the caller ID subscriber from a private or unknown number, the caller will hear the announcements indicating that the party they are calling does not accept unidentified calls. The caller can enter the privileged caller code at any time during the interruptible announcements. If a privileged caller code is entered, the caller identification system verifies that the privileged caller code is correct for this caller ID subscriber. If it is correct, the caller identification system will route the caller directly to the caller ID subscriber's line, bypassing the rest of the unidentified call processing procedure. The caller ID subscriber's phone will ring with a distinctive ring, and the caller ID subscriber's visual display unit will display a message, such as "Privileged Call," and distinguishable symbols for the calling number, such as "000-000-0000."

DETAILED DESCRIPTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
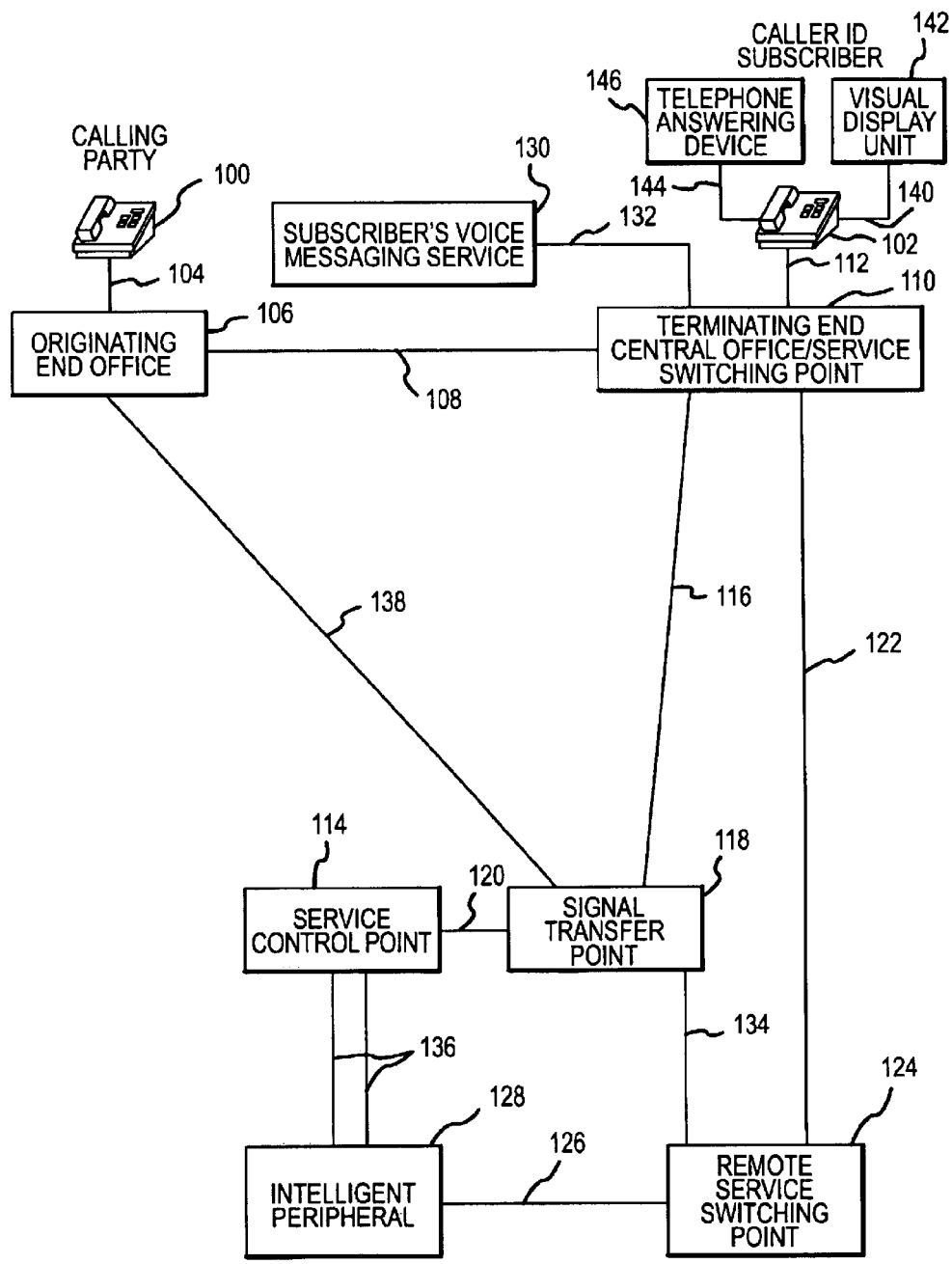
FIG. 1 is a block diagram of an embodiment of the caller identification system of the present invention where a caller ID subscriber is serviced by a central office having the ability to bridge on an intelligent peripheral without double trunking.

FIG. 1 is a block diagram of an embodiment of the caller identification system of the present invention where a caller ID subscriber is serviced by a central office having the ability to bridge on a voice response platform within an intelligent peripheral without double trunking. In this embodiment of the invention, the caller identification system operates with switches on a Signaling System 7 protocol network that supports Advanced Intelligent Network capabilities.

Referring now to FIG. 1, a calling party dials from telephone 100 a directory number for a caller ID subscriber having a telephone 102. Telephone 100 is connected to originating end central office 106 through local trunk 104. Originating end central office 106 is connected to terminating end central office 110 through interoffice trunk 108. Telephone 102 is connected to terminating end central office 110 through local trunk 112. Terminating end central office 110 may be a digital electronic switching system of a suitable type, such as a 5ESS from Lucent, or a DMS100 from Nortel, or an analog electronic switching system of a suitable type, such as a 1 AESS from Lucent.

The caller ID subscriber's directory number is provisioned with a termination attempt trigger in terminating end central office 110. The termination attempt trigger causes terminating end central office 110, when it receives a call for the caller ID subscriber's directory number, to suspend connecting the call and send a query to services control point 114. Services control point 114 is a platform that contains a database containing the caller ID subscriber's call processing records and call processing instructions. Services control point 114 uses this information to provide call processing instructions to terminating end central office 110 and other platforms for the caller identification system of the present invention.

The query from terminating end central office 110 is sent over signaling circuit 116 to signal transfer point 118 over signaling circuit 120 to services control point 114. Signal transfer point 118 is a packet switch. Signaling circuit 116, signaling circuit 120, signaling circuit 134, signaling circuits 136, and signaling circuit 138 are part of the Signaling System 7 network.

Services control point 114 responds to the query from terminating end central office 110 and detects caller ID service through accessing the caller ID subscriber's call processing record. Services control point 114 then sends a call processing instruction to terminating end central office 110, which establishes a trunk 122 to access intelligent peripheral 128 through a common direct inward dial telephone number. Trunk 122 is routed through remote service switching point 124, and temporarily bridges intelligent peripheral 128 in the caller ID subscriber's local calling area, with the calling party. The common direct inward dial telephone number routes the calling party through the primary rate ISDN trunk 126 in the caller ID subscriber's local calling area. Intelligent peripheral 128 is the platform that provides audio announcements, collects telephone keypad input, records calling party names, and outdials the caller ID subscriber under the direction of services control point 114 through signaling circuits 136.

Once the calling party is connected to intelligent peripheral 128 within the caller ID subscriber's local calling area, then intelligent peripheral 128 begins playing messages for output in telephone 100, and attempts to collect telephone keypad input from telephone 100.

If the calling party is calling from a blocked or private number, and the calling party presses the one (1) key on the telephone keypad of telephone 100, then the calling party's name and telephone number are unblocked for this call only. Services control point 114 then instructs terminating end central office 110 to drop the trunk 122 and route the calling party to the caller ID subscriber's telephone 102.

If the calling party is calling from a blocked or private number, or from an unknown number, and the calling party presses the two (2) key on the telephone keypad of telephone 100 or waits, then services control point 114 instructs terminating end central office 110 to drop the bridged connection to intelligent peripheral 128 and route the calling party directly to intelligent peripheral 128. Intelligent peripheral 128 then records the calling party's name, puts the calling party on hold, and outdials to the caller ID subscriber's line. Trunk 122 is then disconnected. The procedure immediately described above is also followed if the calling party is from an unknown number, and the calling party presses the one (1) key or waits.

Intelligent peripheral 128 then rings telephone 102 with a distinctive ring to let the caller ID subscriber know that the incoming call is unidentified. Intelligent peripheral 128 also causes visual display unit 142, connected to telephone 102 through connection 140, to display a special message and special symbols where the calling party's phone number is usually displayed, or no symbols at all. Both the message and the symbols, if any or lack of any, are indicators to the caller ID subscriber that the incoming call will be audibly announced since the telephone number and possibly the name of the calling party are unknown.

If telephone 102 is answered, either by the caller ID subscriber or telephone answering device 146 connected to telephone 102, a recorded message is played asking the caller ID subscriber to press the one (1) key on the telephone keypad. If no DTMF tone is detected, indicating that the caller ID subscriber did not press any key on the telephone keypad or no dual tone multi-frequency has been recorded on the recorded message of telephone answering device 146, the calling party is connected to the caller ID subscriber's line to leave a message on the caller ID subscriber's telephone answering device 146.

If the caller ID subscriber presses the one (1) key on the telephone keypad to accept the call, then intelligent peripheral 128, after receiving this accept input, connects the calling party to the caller ID subscriber's line. If the caller ID subscriber presses the two (2) key on the telephone keypad to reject the call, then intelligent peripheral 128, after receiving this reject input, connects the calling party to the subscriber's voice messaging service 130. Trunk 132 connects terminating end central office 110 to the subscriber's voice messaging service 130. If the caller ID subscriber does not have subscriber's voice messaging service 130, then intelligent peripheral 128 terminates the call. Primary rate ISDN trunk 126 is disconnected once the call is terminated. Local trunk 104, local trunk 112, interoffice trunk 108, trunk 132, trunk 122, and primary rate ISDN trunk 126 are all voice grade connections.

Figure 2:
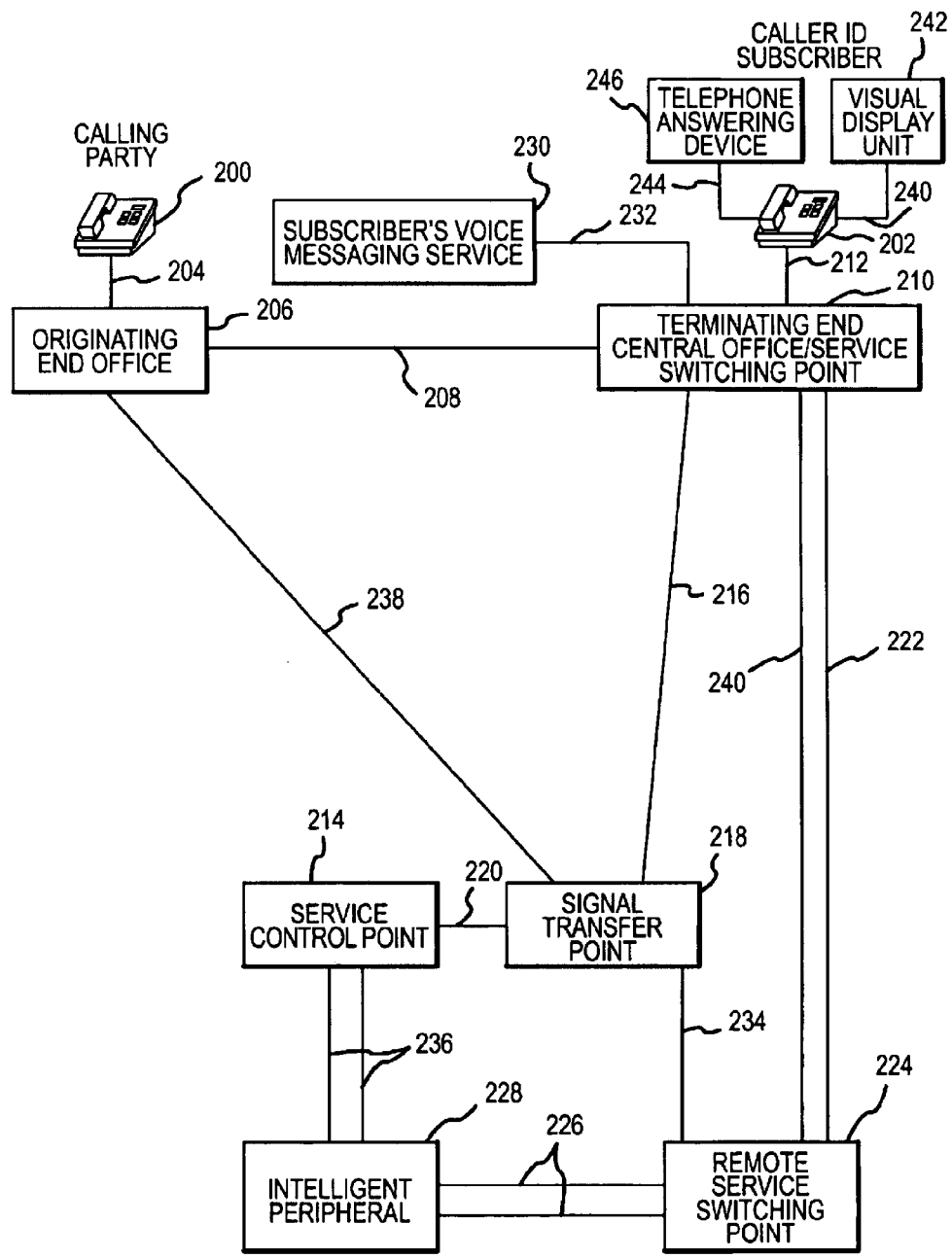
FIG. 2 is a block diagram of an embodiment of the caller identification system of the present invention where a caller ID subscriber is serviced by a central office having to double trunk to access an intelligent peripheral.

FIG. 2 is a block diagram of an embodiment of the caller identification system of the present invention where a caller ID subscriber is serviced by a central office having to double trunk to access a voice response platform within an intelligent peripheral. In the preferred embodiment of the invention, the caller identification system operates with switches on a Signaling System 7 network that supports Advanced Intelligent Network capabilities.

Referring now to FIG. 2, a calling party dials from telephone 200 a directory number for a caller ID subscriber having a telephone 202. Telephone 200 is connected to originating end central office 206 through local trunk 204. Originating end central office 206 is connected to terminating end central office 210 through interoffice trunk 208. Telephone 202 is connected to terminating end central office 210 through local trunk 212. Terminating end central office 210 may be a digital electronic switching system of a suitable type, such as a 5ESS from Lucent, or a DMS100 from Nortel, or an analog electronic switching system of a suitable type, such as a 1AESS from Lucent.

The caller ID subscriber's directory number is provisioned with a termination attempt trigger in terminating end central office 210. The termination attempt trigger causes terminating end central office 210, when it receives a call for the caller ID subscriber's directory number, to suspend connecting the call and send a query to services control point 214. Services control point 214 is a platform that contains a database containing the caller ID subscriber's call processing records and call processing instructions. Services control point 214 uses this information to provide call processing instructions to terminating end central office 210 and other platforms for the caller identification system of the present invention.

The query from terminating end central office 210 is sent over signaling circuit 216 to signal transfer point 218 over signaling circuit 220 to services control point 214. Signal transfer point 218 is a packet switch. Signaling circuit 216, signaling circuit 220, signaling circuit 234, signaling circuits 236, and signaling circuit 238 are part of the Signaling System 7 network.

Services control point 214 responds to the query from terminating end central office 210 and detects caller ID service through accessing the caller ID subscriber's call processing record. Services control point 214 then sends a call processing instruction to terminating end central office 210, instructing terminating end central office 210 to route the calling party to a common direct inward dial telephone number in order to reach the intelligent peripheral 228 within the caller ID subscriber's local calling area. Trunk 222 is used to access intelligent peripheral 228 through the common direct inward dial telephone number. Terminating end central office 210 routes the calling party over trunk 222 to remote service switching point 224 which serves intelligent peripheral 228. The common direct inward dial telephone number routes the calling party through the primary rate ISDN trunk group 226 to intelligent peripheral 228 in the caller ID subscriber's local calling area. Intelligent peripheral 228 is the platform that provides audio announcements, collects telephone keypad input, records calling party names, and outdials the caller ID subscriber under the direction of services control point 214 through signaling circuits 236.

Once the calling party is connected to intelligent peripheral 228 within the caller ID subscriber's local calling area, then intelligent peripheral 228 begins playing messages for output in telephone 200, and attempts to collect telephone keypad input from telephone 200.

If the calling party is calling from a blocked or private number, and the calling party presses the one (1) key on the telephone keypad of telephone 200, then the calling party's name and telephone number are unblocked for this call only. Intelligent peripheral 228 then outdials over trunk 240 the caller ID subscriber's telephone 202 with a distinctive ring.

If the calling party is calling from a blocked or private number, and the calling party presses the two (2) key on the telephone keypad of telephone 200 or waits, intelligent peripheral 228 then records the calling party's name, puts the calling party on hold, and outdials over trunk 240 to the caller ID subscriber's line.

Terminating end central office 210 then rings telephone 202 with a distinctive ring to let the caller ID subscriber know that the incoming call is unidentified. Terminating end central office 210 also causes visual display unit 242, connected to telephone 202 through connection 240, to display a special message and special symbols where the calling party's phone number is usually displayed, or no symbols at all. Both the message and the symbols, if any or lack of any, are indicators to the caller ID subscriber that the incoming call will be audibly announced since the telephone number and possibly the name of the calling party are unknown.

If telephone 202 is answered, either by the caller ID subscriber or telephone answering device 246 connected to telephone 202, a recorded message is played asking the caller ID subscriber to press the one (1) key on the telephone keypad. If no dual tone multi-frequency (DTMF) is detected, indicating that the caller ID subscriber did not press any key on the telephone keypad or no dual tone multi-frequency has been recorded on the recorded message of telephone answering device 246, the calling party is connected to the caller ID subscriber's line to leave a message on the caller ID subscriber's telephone answering device 246.

If the caller ID subscriber answers telephone 202, a recorded message is played asking the caller ID subscriber to press the one (1) key on the telephone keypad. If the caller ID subscriber presses the one (1) key on the telephone keypad to accept the call, then intelligent peripheral 228, after receiving this accept input, connects the calling party to the caller ID subscriber's line. If the caller ID subscriber presses the two (2) key on the telephone keypad to reject the call, then intelligent peripheral 228, after receiving this reject input, connects the calling party to the subscriber's voice messaging service 230. Trunk 232 connects terminating end central office 210 to the subscriber's voice messaging service 230. If the caller ID subscriber does not have subscriber's voice messaging service 230, then intelligent peripheral 228 terminates the call. Primary rate ISDN trunk group 226 is disconnected once the call is terminated. Local trunk 204, local trunk 212, interoffice trunk 208, trunk 232, trunk 222, trunk 240, and primary rate ISDN trunk group 226 are all voice grade connections.

Figure 3:
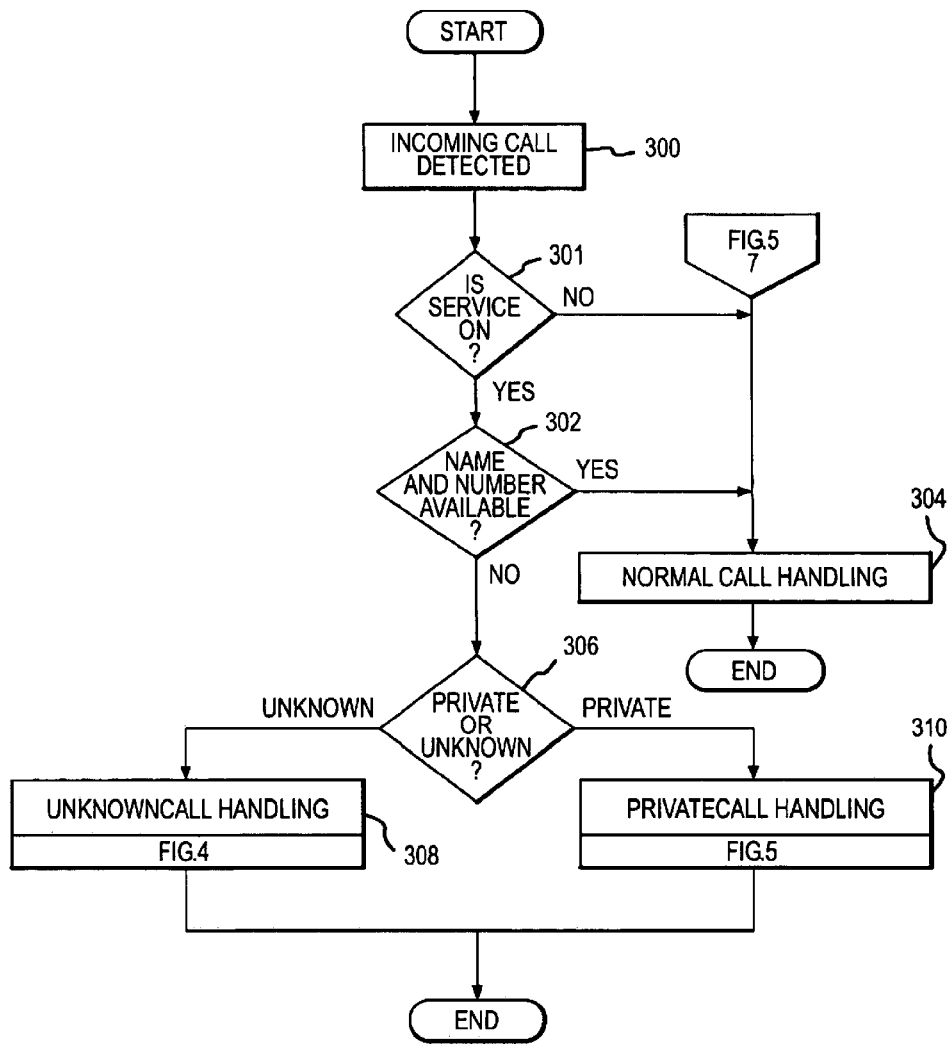
FIG. 3 is a flow chart of the process of initial incoming call handling of the caller identification system of the present invention.

FIG. 3 is a flow chart of the process of initial incoming call handling of the caller identification system of the present invention. Referring now to FIG. 3, in step 300 a calling party has dialed the directory number of a caller ID subscriber, and the incoming call is detected by the caller identification system of the present invention as described in FIG. 1 or FIG. 2 and has determined that the caller ID subscriber has caller ID service. Step 301 determines if the caller ID subscriber has turned the caller ID service on or off. If step 301 determines that the caller ID service has been turned off, then control passes to step 304 for normal call handling. If step 301 determines that the caller ID service is turned on, then step 302 determines if the name and ten digit calling number of the calling party are available to the caller identification system of the present invention. If step 302 determines that the name and ten digit calling number are available, then in step 304 the call is handled in a fashion typical of that found in prior art caller identification systems.

If step 302 determines that the name and ten digit calling number are not available to the caller identification system of the present invention, then step 306 determines if the number is unknown or private. If the number is unknown, then step 308 calls the process of FIG. 4 for unknown call handling. If the number is private, then step 310 calls the process of FIG. 5 for private call handling. After returning from either FIG. 4 or FIG. 5, the caller identification system process ends.

Figure 4:
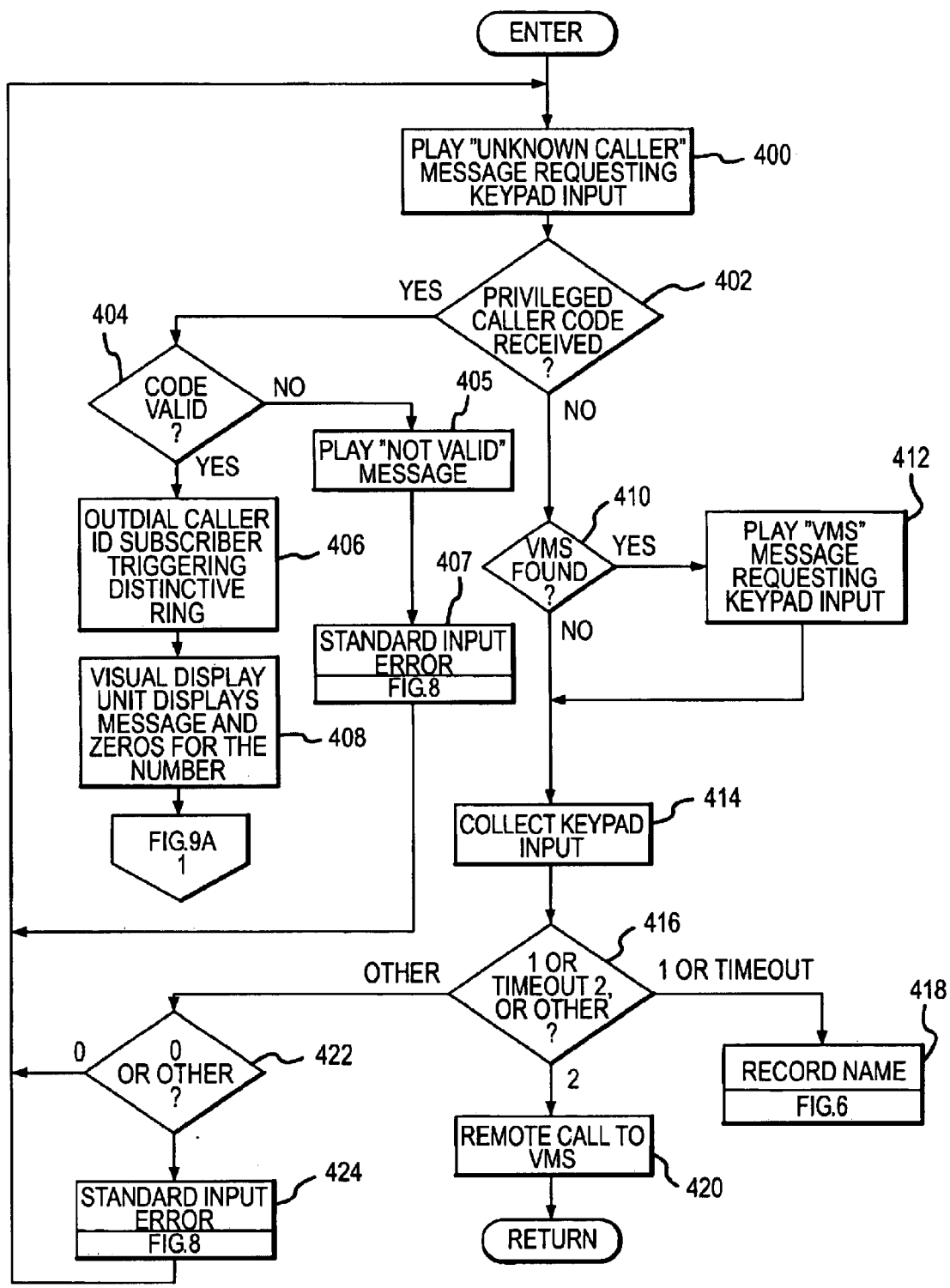
FIG. 4 is a flow chart of the process of unknown call handling of the caller identification system of the present invention.

FIG. 4 is a flow chart of the process of unknown call handling of the caller identification system of the present invention. Referring now to FIG. 4, which is called from FIG. 3, in step 400 an audible "Unknown Caller" message is played over the calling party's telephone. For example, the prerecorded message may say "The number you are calling does not accept unidentified calls. To record your name for identification, press ONE or simply wait." Step 402 determines if a privileged caller code is received from the calling party's telephone while the message from step 400 is being played. If a privileged caller code is not received, control passes to step 410.

If step 402 determines that a privileged caller code was received while the message from step 400 was being played, then step 404 verifies that the privileged caller code is valid for the directory number for the caller ID subscriber being called by the calling party. If the privileged caller code is invalid, in step 405 an audible "Not Valid" message is played over the calling party's telephone. For example, the prerecorded message may say "Sorry. That code does not work." Step 407 then calls the process of FIG. 8 for standard input error processing. After returning from FIG. 8, control returns to step 400. If step 404 determines that the privileged caller code is valid, then step 406 outdials the directory number of the caller ID subscriber. This triggers a distinctive ring in the caller ID subscriber's telephone, indicating that the incoming call will be audibly announced since the telephone number and possibly the name of the calling party are not available. Step 408 displays "Privileged Call" and "000-000-0000" on the caller ID subscriber's visual display unit, indicating that the call is from a privileged caller. Control then passes to step 904 of FIG. 9A for caller ID subscriber interaction.

Step 410 checks to see if the caller ID subscriber has a voice messaging service. If yes, then step 412 plays an audible "Voice Messaging Service" message. For example, the prerecorded message may say "To leave a message press TWO." Control then passes to step 414. If step 410 determines that the caller ID subscriber does not have a voice messaging service, then control passes to step 414.

In step 414 the input from the keypad of the calling party's telephone, if any, is collected. Step 416 determines what input, if any, was collected, or if a period of time passed without any keypad input. This period of time is referred to as a timeout, and is typically only a few seconds. If step 416 determines that a one (1) was collected, meaning that the calling party pressed the one (1) key on the calling party's telephone keypad, or if the timeout period passed before any keypad input was received, then step 418 calls the process of FIG. 6 for recording the name of the calling party.

If step 416 determines that a two (2) key input was collected, meaning that the calling party pressed the two (2) key on the calling party's telephone keypad, then step 420 routes the telephone call to the caller ID subscriber's voice messaging service, and the caller identification system process ends.

If step 416 determines that some other input besides the one (1) key or the two (2) key was collected, or the passage of the timeout period without any keypad input, then step 422 determines if the input was the zero (0) key or any other remaining keypad input. If the zero (0) key input was collected, then control returns to step 400 where the unknown caller message is played again. If step 422 determines that the input collected was any other remaining keypad input, then step 424 calls the process of FIG. 8 for standard input error processing. After returning from FIG. 8, control returns to step 400.

Figure 5:
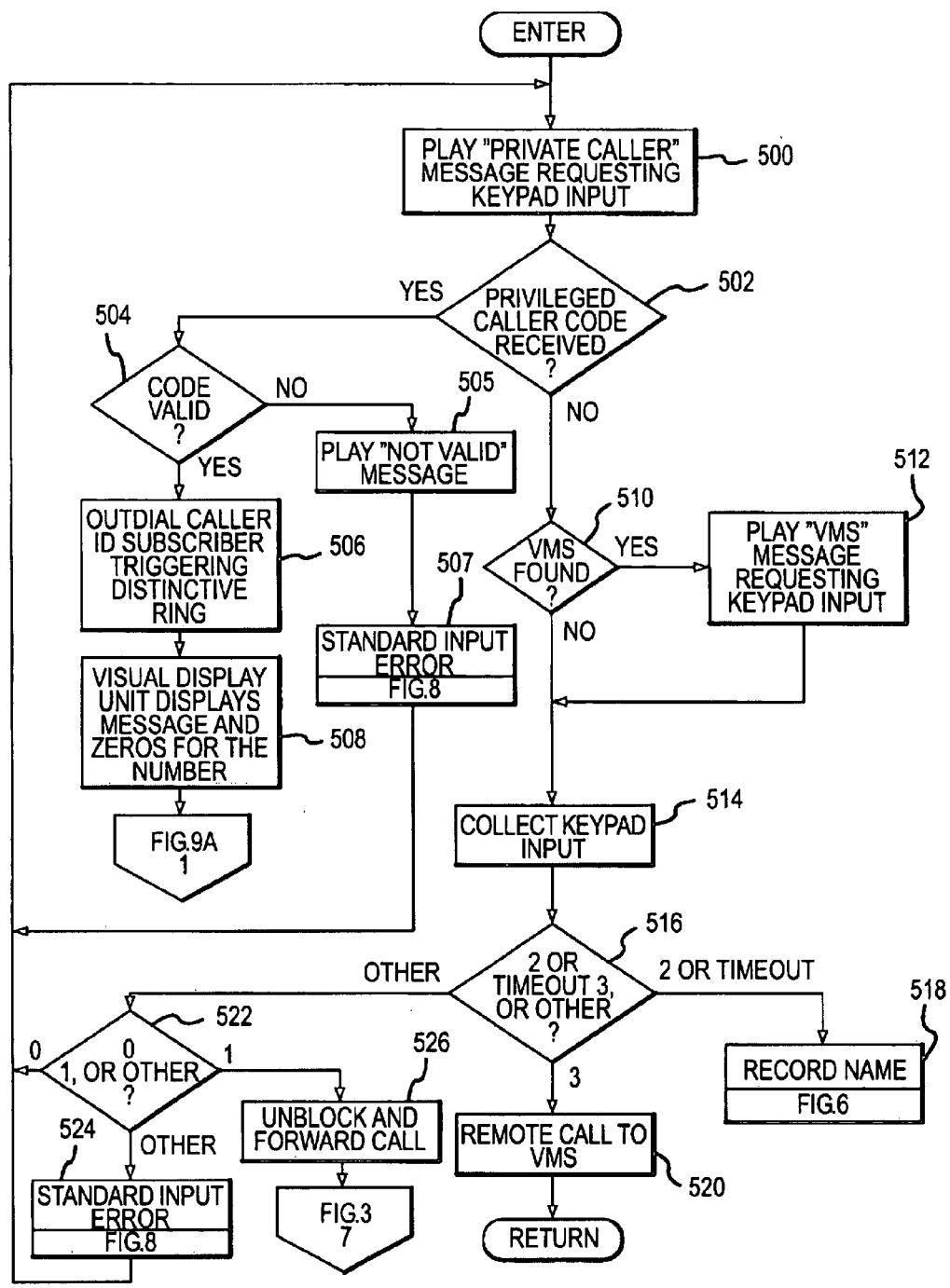
FIG. 5 is a flow chart of the process of private call handling of the caller identification system of the present invention.

FIG. 5 is a flow chart of the process of private call handling of the caller identification system of the present invention. Referring now to FIG. 5, which is called from FIG. 3, in step 500 an audible "Private Caller" message is played over the calling party's telephone. For example, the prerecorded message may say "The number you are calling does not accept unidentified calls. To automatically unblock your name and number for this call only and complete the call press ONE. To record your name for identification, press TWO or simply wait." Step 502 determines if a privileged caller code is received from the calling party's telephone while the message from step 500 is being played. If a privileged caller code is not received, control passes to step 510.

If step 502 determines that a privileged caller code was received while the message from step 500 was being played, then step 504 verifies that the code is valid for the directory number for the caller ID subscriber being called by the calling party. If the privileged caller code is invalid, in step 505 an audible "Not Valid" message is played over the calling party's telephone. For example, the prerecorded message may say "Sorry. That code does not work." Step 507 then calls the process of FIG. 8 for standard input error processing. After returning from FIG. 8, control returns to step 500. If step 504 determines that the privileged caller code is valid, then step 506 outdials the directory number of the caller ID subscribers. This triggers a distinctive ring in the caller ID subscriber's telephone, indicating that the incoming call will be audibly announced since the telephone number and possibly the name of the calling party are not available. Step 508 displays "Privileged Call" and "000-000-0000" on the caller ID subscriber's visual display unit, indicating that the call is from a privileged caller. Control then passes to step 904 of FIG. 9A for caller ID subscriber interaction.

Step 510 checks to see if the caller ID subscriber has a voice messaging service. If yes, then step 512 plays an audible "Voice Messaging Service" message. For example, the prerecorded message may say "To leave a message press THREE." Control then passes to step 514. If step 510 determines that the caller ID subscriber does not have a voice messaging service, then control passes to step 514.

In step 514 the input from the keypad of the calling party's telephone, if any, is collected. Step 516 determines what input, if any, was collected, or if a period of time passed without any keypad input. This period of time is referred to as a timeout, and is typically only a few seconds. If step 516 determines that a two (2) was collected, meaning that the calling party pressed the two (2) key on the calling party's telephone keypad, or if the timeout period passed before any keypad input was received, then step 518 calls the process of FIG. 6 for recording the name of the calling party.

If step 516 determines that a three (3) key input was collected, meaning that the calling party pressed the three (3) key on the calling party's telephone keypad, then step 520 routes the telephone call to the caller ID subscriber's voice messaging service, and the caller identification system process ends.

If step 516 determines that some other input besides the two (2) key or the three (3) key was collected, or the passage of the timeout period without any keypad input, then step 522 determines if the input was the zero (0) key, the one (1) key, or any other remaining keypad input. If step 522 determines that the zero (0) key input was collected, then control returns to step 500 where the unknown caller message is played again. If step 522 determines that the one (1) key input was collected, then in step 526 the caller identification system will unblock the calling party's name and number for the current call only, and the call will be forwarded to the subscriber's telephone. Control then returns to step 304 of FIG. 3 for normal call processing, and the caller identification system process ends. If step 522 determines that the input collected was any other remaining keypad input, then step 524 calls the process of FIG. 8 for standard input error processing. After returning from FIG. 8, control returns to step 500.

Figure 6:
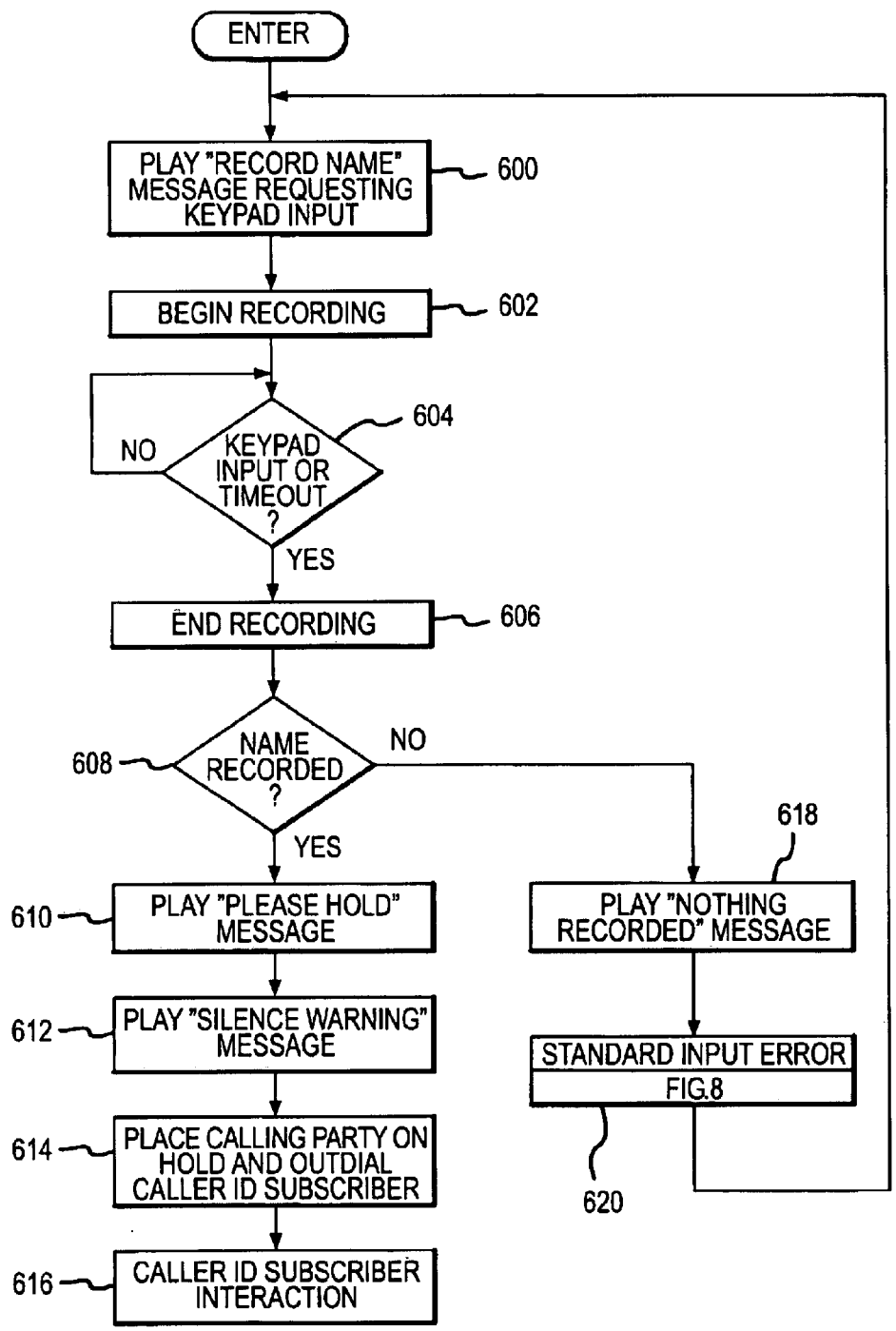
FIG. 6 is a flow chart of the process of recording a calling party's name of the caller identification system of the present invention.

FIG. 6 is a flow chart of the process of recording a calling party's name of the caller identification system of the present invention. Referring now to FIG. 6, which is called from FIG. 4 or from FIG. 5, in step 600 an audible "Record Name" message is played over the calling party's telephone. For example, the prerecorded message may say "At the tone, please say your name, then press POUND." Step 602 begins recording after the tone. Step 604 then periodically checks to see if pound (#) key input from the calling party's telephone is received, or if the passage of a timeout period has occurred. The timeout period is normally only a few seconds. If step 604 determines that no keypad input has been received, and the passage of the timeout period has not occurred, then the caller identification system continues recording until the next periodic check occurs. If step 604 determines that keypad input has been received, or that the timeout period has elapsed, then in step 606 recording ends. Step 608 determines if a name was recorded in the time interval between step 602 and step 606. If no name was recorded, then in step 618 an audible "Nothing Recorded" message is played over the calling party's telephone. For example, the prerecorded message may say "We did not get your name." Step 620 then calls the process of FIG. 8 for standard input error processing. After returning from FIG. 8, control returns to step 600.

If step 608 determines that a name was recorded, then in step 610 an audible "Please Hold" message is played over the calling party's telephone. For example, the prerecorded message may say "Thank you. Please hold." Step 612 than plays an audible "Silence Warning" message over the calling party's telephone. For example, the prerecorded message may say "You will now hear silence until connected." Step 614 then places the calling party on hold, and outdials the directory number of the caller ID subscriber. Step 616 then calls the process of FIG. 9A for caller ID subscriber interaction.

Figure 7:
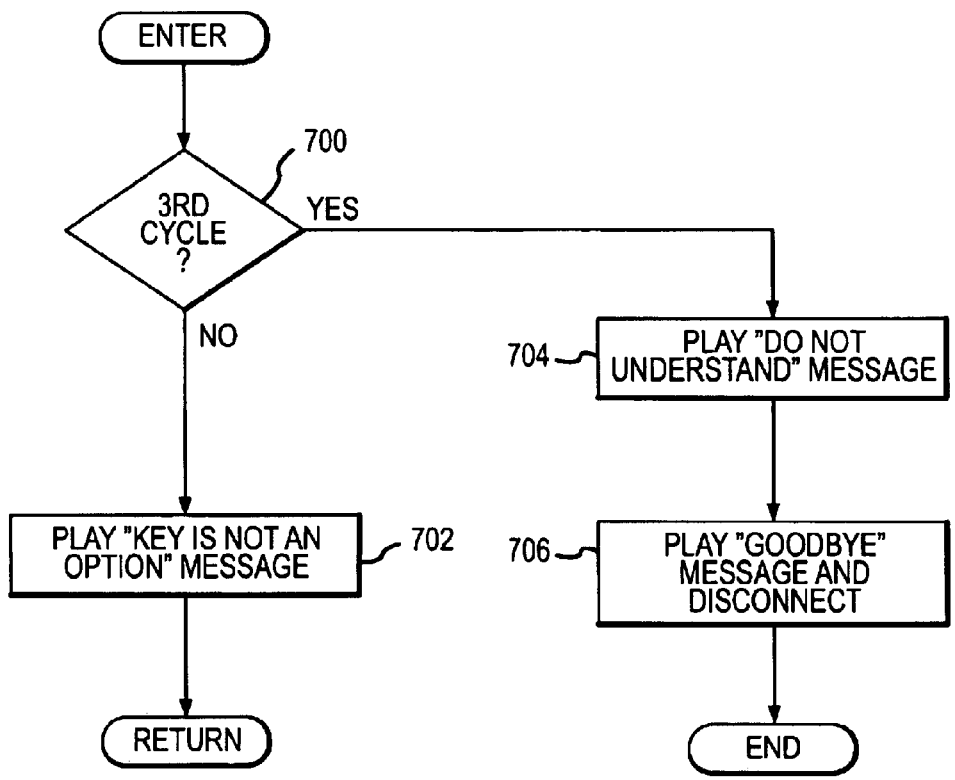
FIG. 7 is a flow chart of the process of handling a standard menu error of the caller identification system of the present invention.

FIG. 7 is a flow chart of the process of handling a standard menu error of the caller identification system of the present invention. Referring now to FIG. 7, which is called from FIG. 4 or from FIG. 5, step 700 determines if this is the third time in a row that the standard menu error process has been called from FIG. 4 for the current incoming call, or the third time in a row that the standard menu error process has been called from FIG. 5 for the current incoming call. If no, then in step 702 an audible "KEY Is Not An Option" message is played over the calling party's telephone. For example, the prerecorded message may say "Three is not an option" if the calling party pressed the three (3) key on the telephone keypad and the three (3) key input was not appropriate. Or, the prerecorded message may say "STAR is not an option" if the calling party pressed the star (*) key on the telephone keypad and the star (*) key input was not appropriate. If FIG. 7 was called from FIG. 4, then control returns to step 400. If FIG. 7 was called from FIG. 5, then control returns to step 500.

If step 700 determines that this is the third time in a row that the standard menu error process has been called from FIG. 4 for the current incoming call, or the third time in a row that the standard menu error process has been called from FIG. 5 for the current incoming call, then in step 704 an audible "Do Not Understand" message is played over the calling party's telephone. For example, the prerecorded message may say "The system did not understand your request. Please try again later." Step 706 then plays an audible "Goodbye" message over the calling party's telephone. For example, the prerecorded message may say "Goodbye." The calling party is then disconnected, and the caller identification system process ends.

Figure 8:
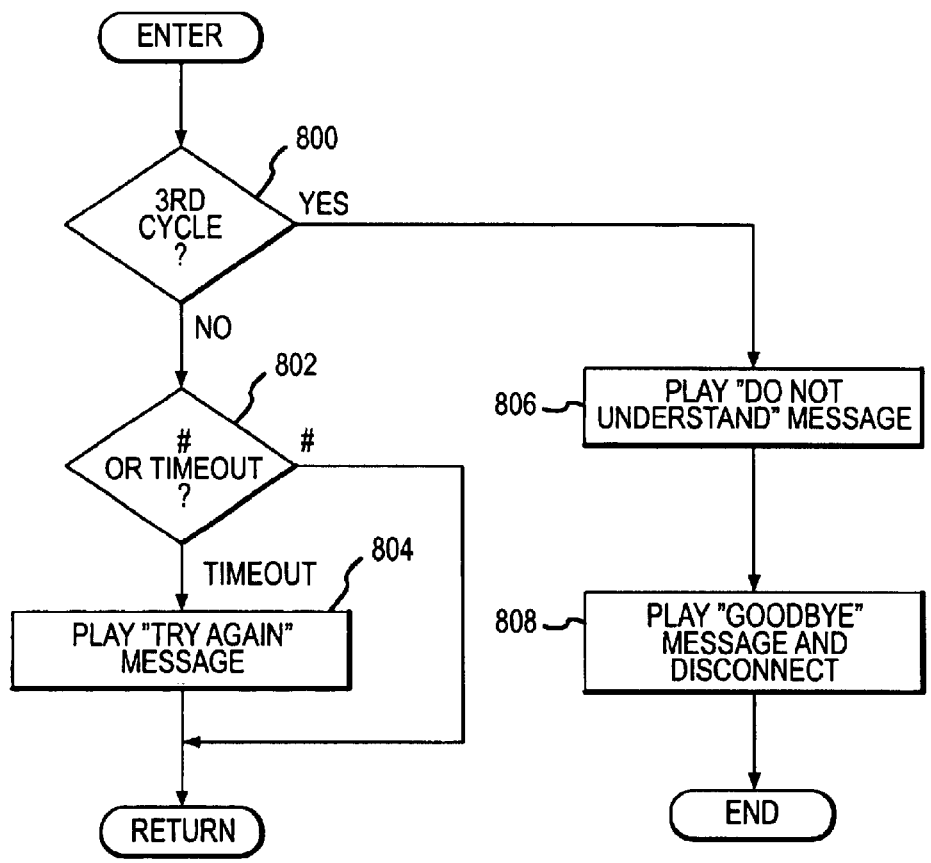
FIG. 8 is a flow chart of the process of handling a standard input error of the caller identification system of the present invention.

FIG. 8 is a flow chart of the process of handling a standard input error of the caller identification system of the present invention. Referring now to FIG. 8, which is called from FIG. 6, step 800 determines if this is the third time in a row that the standard input error process has been called from FIG. 6 for the current incoming call. If no, then step 802 determines if pound (#) key input has been received, or if the passage of a timeout period has occurred. The timeout period is normally only a few seconds. If step 802 determines that pound (#) key input has been received prior to the timeout period elapsing, then control returns to step 600 in FIG. 6. If step 802 determines that the timeout period has elapsed before pound (#) key input is received, then in step 804 an audible "Try Again" message is played over the calling party's telephone. For example, the prerecorded message may say "Please try again." Control then returns to step 600 in FIG. 6.

If step 800 determines that this is the third time in a row that the standard input error process has been called from FIG. 6 for the current incoming call, then in step 806 an audible "Do Not Understand" message is played over the calling party's telephone. For example, the prerecorded message may say "The system did not understand your request. Please try again later." Step 808 then plays an audible "Goodbye" message over the calling party's telephone. For example, the prerecorded message may say "Goodbye."The calling party is then disconnected, and the caller identification system process ends.

Figure 9A:
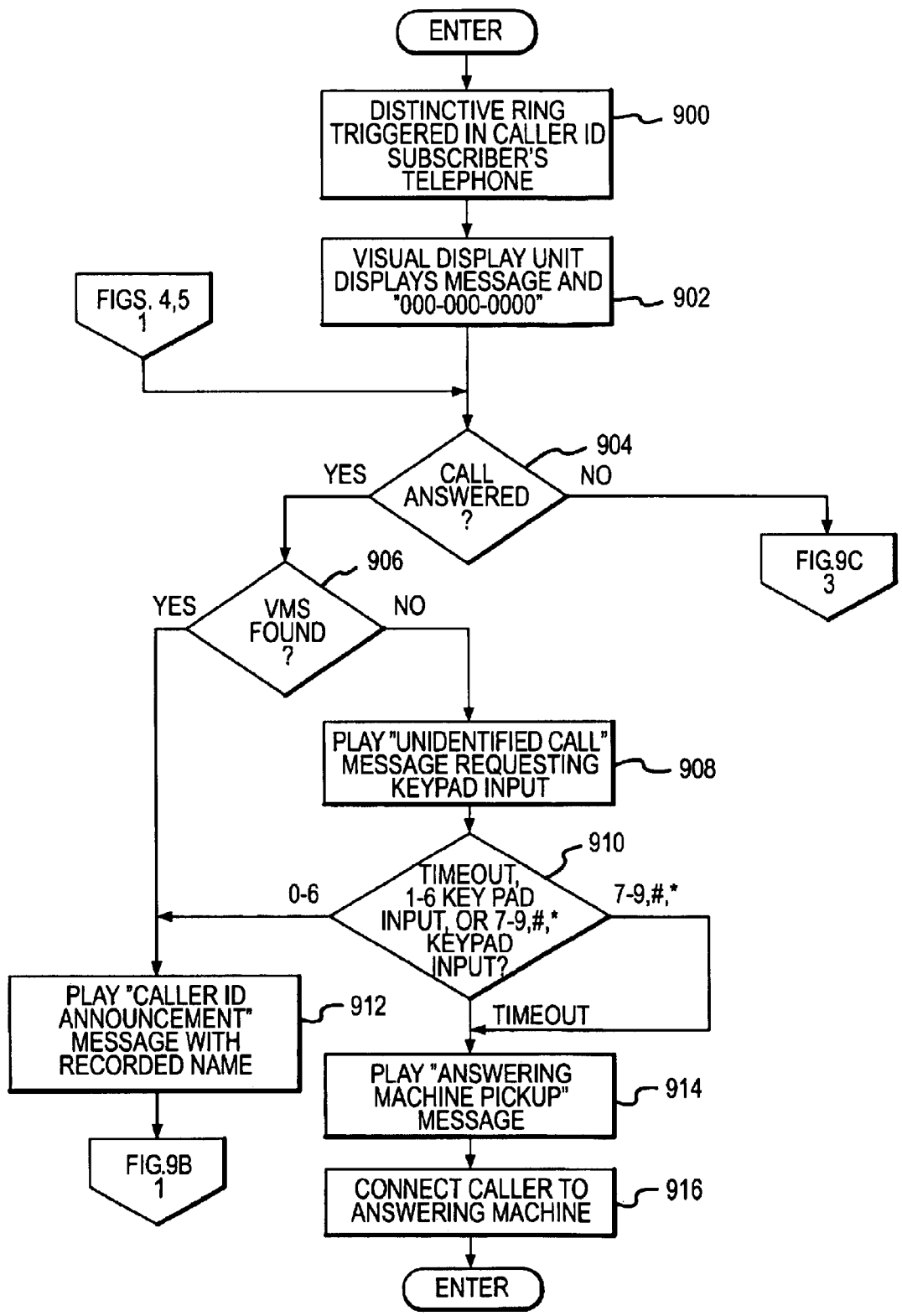
FIGS. 9A, 9B, 9C, 9D, and 9E constitute a flow chart of the process of the caller ID subscriber interaction of the caller identification system of the present invention.

FIGS. 9A, 9B, 9C, 9D, and 9E are a flow chart of the process of the caller ID subscriber interaction of the caller identification system of the present invention. Referring now to FIG. 9A, which is called from FIG. 6, in step 900 a distinctive ring is triggered in the caller ID subscriber's telephone indicating that the incoming call will be audibly announced since the telephone number and possibly the name of the calling party are not available. Step 902 displays a special message on the caller ID subscriber's visual display unit indicating that the incoming call will be audibly announced since the telephone number and possibly the name of the calling party are not available. The message may say "Privacy +" or any other message indicating that the call is from an unidentified caller. Step 902 also displays the symbols "000-000-0000" on some visual display units, and on other visual display units, no symbols are displayed. Both mean that the telephone number of the calling party is not available. Control then passes to step 904.

Step 904, which may also be entered from step 408 of FIG. 4 or step 508 of FIG. 5, determines if the caller ID subscriber telephone is answered. The telephone may be answered by the caller ID subscriber, or by a telephone answering device connected to the caller ID subscriber's line. If step 904 determines that the caller ID subscriber telephone is not answered, control passes to step 946 of FIG. 9C. If step 904 determines that the caller ID subscriber telephone is answered, either by the caller ID subscriber or by a telephone answering device, then step 906 determines if the caller ID subscriber has a voice messaging service. If yes, then in step 912 an audible "Caller ID Announcement" message and the calling party's name are played over the caller ID subscriber's telephone. For example, the prerecorded message, which may begin with a one second pause, may say "This is Privacy Plus. You have a call from . . . ," and then the recorded name recorded in FIG. 6 is played. Control then passes to step 920 of FIG. 9B.

If step 906 determines that the caller ID subscriber does not have a voice messaging service, then in step 908 an audible "Unidentified Call" message requesting keypad input is played over the caller ID subscriber's telephone. For example, the prerecorded message may say "Unidentified call, press ONE now, (1.5 second pause) press ONE now."

Step 910 determines what type of input is received in response to step 908. If keypad input of zero (0), one (1), two (2), three (3), four (4), five (5), or six (6) is received, even though only keypad input of one (1) was requested, this is considered to be a positive response, and control passes to step 912 which plays the audible "Caller ID Announcement" message and the calling party's name over the caller ID subscriber's telephone. If step 910 determines that the passage of a timeout period occurs without keypad input from the caller ID subscriber's telephone, this is considered to be a negative response, and control passes to step 914. The timeout period is normally only a few seconds. If step 910 determines that keypad input of seven (7), eight (8), nine (9), pound (#), or star (*) is received, which is also considered to be a negative response, then the timeout period is bypassed and control passes immediately to step 914. The caller ID subscriber may record the DTMF for keypad input of seven (7), eight (8), nine (9), pound or star (*) as part of the telephone answering device's recorded message as a signal to the caller identification system to bypass the timeout period.

Step 914 plays an audible "Answering Machine Pickup" message over the caller ID subscriber's telephone. For example, the prerecorded message may say "No response. You will now be sent to a messaging system." Step 916 then connects the calling party to the caller ID subscriber's telephone answering device, and the caller identification system process ends.

Figure 9B:
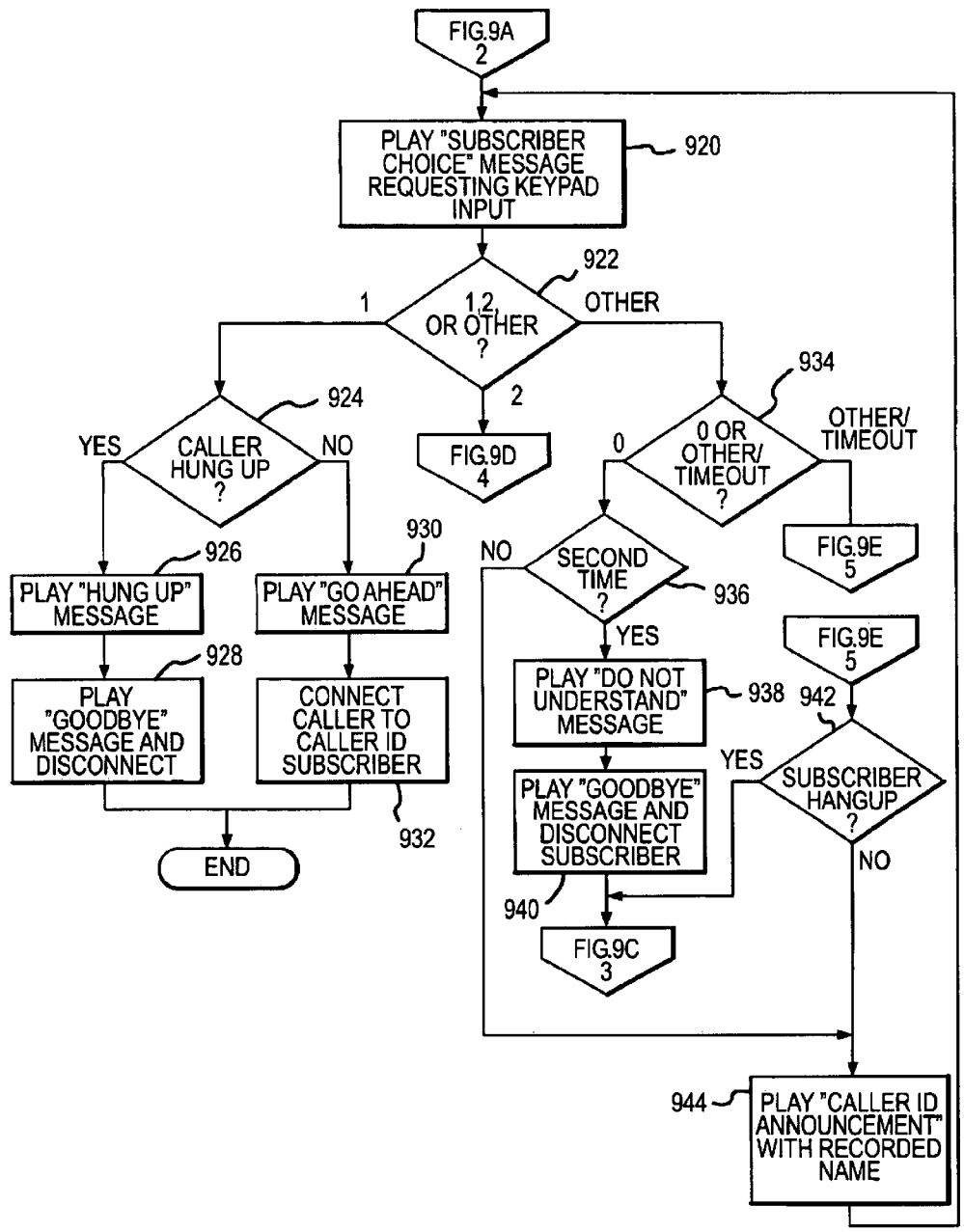

Referring now to FIG. 9B, which is called from step 912 of FIG. 9A, step 920 plays an audible "Subscriber Choice" message over the caller ID subscriber's telephone. For example, the prerecorded message may say "To accept the call, press ONE. To indicate that you are not available, press TWO." Step 922 then determines if keypad input of one (1), keypad input of two (2), or some other input is received. If step 922 determines that keypad input of one (1) is received, which is considered to be an unblock call input, then step 924 determines if the calling party has hung up. If the calling party has hung up, then step 926 plays an audible "Hung Up" message over the caller ID subscriber's telephone. For example, the prerecorded message may say "The caller has hung up." Step 928 then plays an audible "Goodbye" message over the caller ID subscriber's telephone. For example, the prerecorded message may say "Goodbye." The caller ID subscriber is then disconnected, and the caller identification system process ends.

If step 924 determines that the calling party has not hung up, then step 930 plays an audible "Go Ahead" message over the caller ID subscriber's telephone. For example, the prerecorded message may say "Go ahead please." Step 932 then connects the caller ID subscriber to the calling party, and the caller identification system process ends.

Figure 9C:
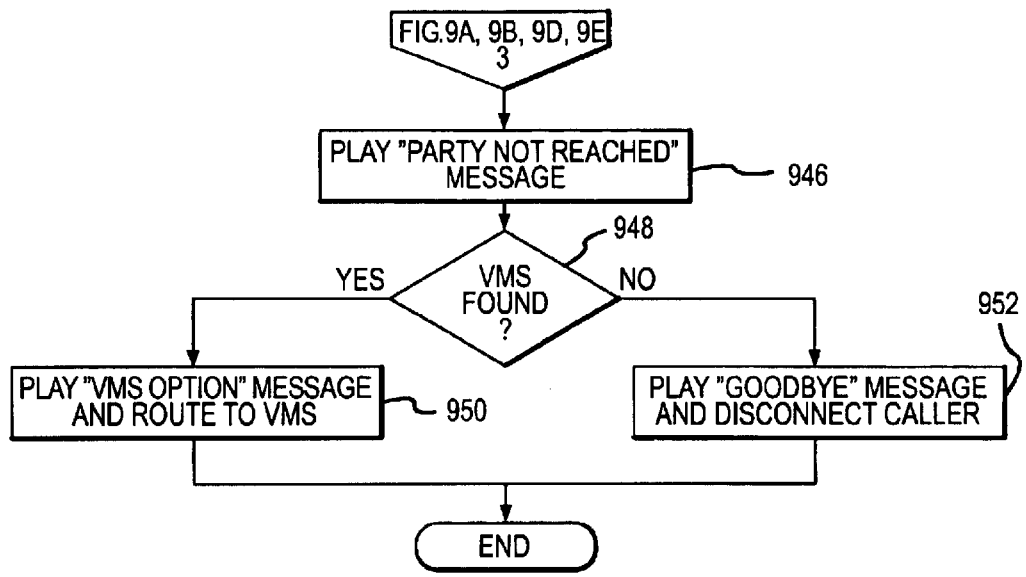
Figure 9D:
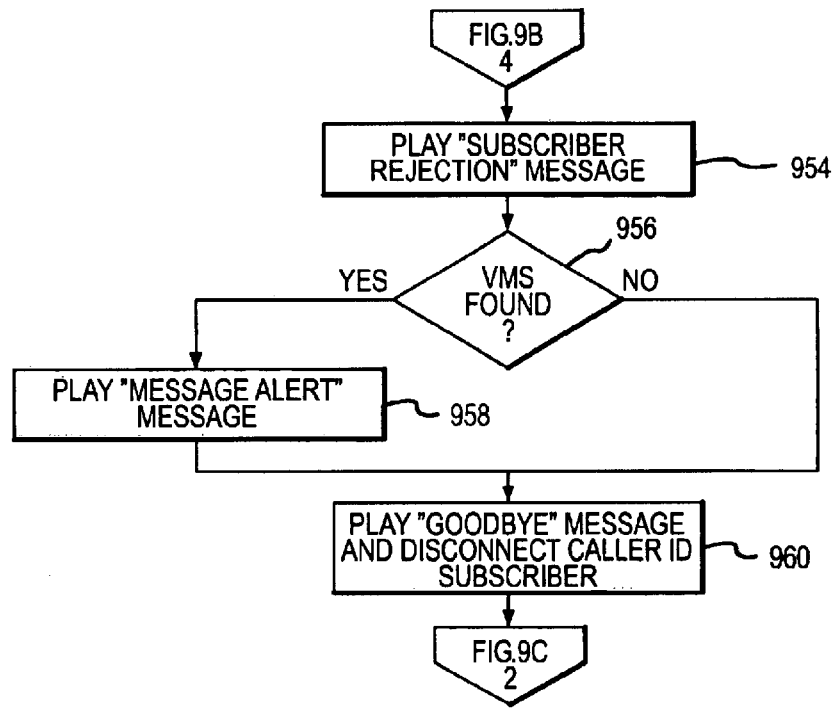

If step 922 determines that keypad input of two (2) is received, then control passes to step 954 of FIG. 9D. If step 922 determines that any other type of input is received, then step 934 determines if zero (0) keypad input is received, or if some other keypad input is received from the caller ID subscriber's telephone or the passage of a timeout period occurs without any keypad input. The timeout period is normally only a few seconds. If step 934 determines that zero (0) keypad input is received, then step 936 determines if this is the second time in a row that zero (0) keypad input has been received from the caller ID subscriber for the current incoming call. If no, control passes to step 944. If step 936 determines that this is the second time in a row that zero (0) keypad input has been received from the caller ID subscriber for the current incoming call, then step 938 plays an audible "Do Not Understand" message over the caller ID subscriber's telephone. For example, the prerecorded message may say "The system did not understand your request." Step 940 then plays an audible "Goodbye" message over the caller ID subscriber's telephone. For example, the prerecorded message may say "Goodbye." The caller ID subscriber is then disconnected, and control passes to step 946 of FIG. 9C.

Figure 9E:
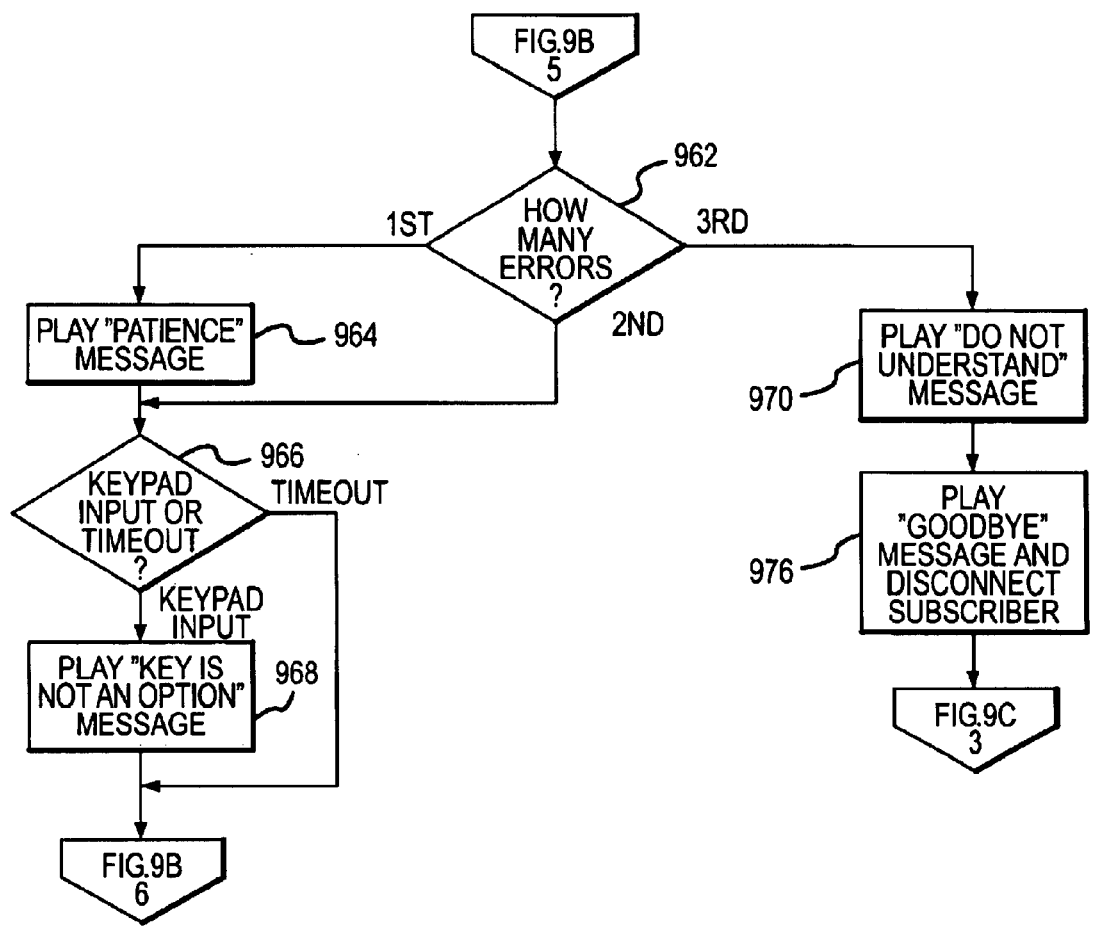

If step 934 determines that some other keypad input is received from the caller ID subscriber's telephone, or the passage of a timeout period occurs without any keypad input, then control passes to step 962 of FIG. 9E. Upon returning from FIG. 9E, step 942 determines if the caller ID subscriber has hung up. If yes, control passes to step to step 946 of FIG. 9C. If step 942 determines that the caller ID subscriber has not hung up, the in step 944 an audible "Caller ID Announcement" message and the calling party's name are played over the caller ID subscriber's telephone. For example, the prerecorded message, which may begin with a one second pause, may say "This is Privacy Plus. You have a call from . . . ," and then the recorded name recorded in FIG. 6 is played. Control then returns to step 920.

Referring now to FIG. 9C, which is called from step 904 of FIG. 9A, or from steps 940 or 942 of FIG. 9B, or from step 960 of FIG. 9D, or from step 972 of FIG. 9E, step 946 plays an audible "Party Not Reached" message over the calling party's telephone. For example, the prerecorded message may say "Sorry, your party could not be reached. Please try again later . . . " Step 948 then determines if the caller ID subscriber has a voice messaging service. If yes, then step 950 plays an audible "VMS Option" message over the calling party's telephone. For example, the prerecorded message may say ". . . or, to leave a message, press POUND or wait." Step 950 then routes the telephone call to the caller ID subscriber's voice messaging service, and the caller identification system process ends.

If step 948 determines that the caller ID subscriber does not have a voice messaging service, then step 952 plays an audible "Goodbye" message over the calling party's telephone. For example, the prerecorded message may say "Goodbye." Step 952 then disconnects the calling party, and the caller identification system process ends.

Referring now to FIG. 9D, which is called from step 922 of FIG. 9B, step 954 plays an audible "Subscriber Rejection" message over the caller ID subscriber's telephone. For example, the prerecorded message may say "The caller will be advised that you could not be reached . . . " Step 956 then determines if the caller ID subscriber has a voice messaging service. If yes, then step 958 plays an audible "Messaging Alert" message over the caller ID subscriber's telephone. For example, the prerecorded message may say ". . . and then sent to your voice messaging service." Control then passes to step 960. If Step 956 determines that the caller ID subscriber does not have a voice messaging service, then step 960 plays an audible "Goodbye" message over the caller ID subscriber's telephone. For example, the prerecorded message may say ". . . Goodbye." The caller ID subscriber is disconnected and control passes to step 946 of FIG. 9C.

Referring now to FIG. 9E, which is called from step 934 of FIG. 9B, step 962 determines the number of input errors that have been made by the caller ID subscriber for the current incoming call. If step 962 determines that this is a first input error by the caller ID subscriber for the current incoming call, then step 964 plays an audible "Patience" message over the calling party's telephone. For example, the prerecorded message may say "Thank you for your patience. Please continue to hold." Step 966 determines if the input error was from keypad input or if the passage of a timeout period occurred without keypad input from the caller ID subscriber's telephone. The timeout period is normally only a few seconds. If the error was from keypad input, then step 968 plays an audible "Key Is Not An Option" message over the caller ID subscriber's telephone. For example, the prerecorded message may say "Three is not an option" if the caller ID subscriber pressed the three (3) key on the telephone keypad and the three (3) key input was not appropriate. Control then returns to step 942 of FIG. 9B. If step 966 determines that the error was from the passage of the timeout period without keypad input from the caller ID subscriber's telephone, then control returns to step 942 of FIG. 9B.

If step 962 determines that this is the second input error by the caller ID subscriber for the current incoming call, then control passes to step 966 as described immediately above.

If step 962 determines that this is the third input error by the caller ID subscriber for the current incoming call, then step 970 plays an audible "Do Not Understand" message over the caller ID subscriber's telephone. For example, the prerecorded message may say "The system did not understand your request. Please try again later." Step 972 then plays an audible"Goodbye" message over the caller ID subscriber's telephone. For example, the prerecorded message may say "Goodbye." The caller ID subscriber is then disconnected, and control passes to step 946 of FIG. 9C.

Figure 10:
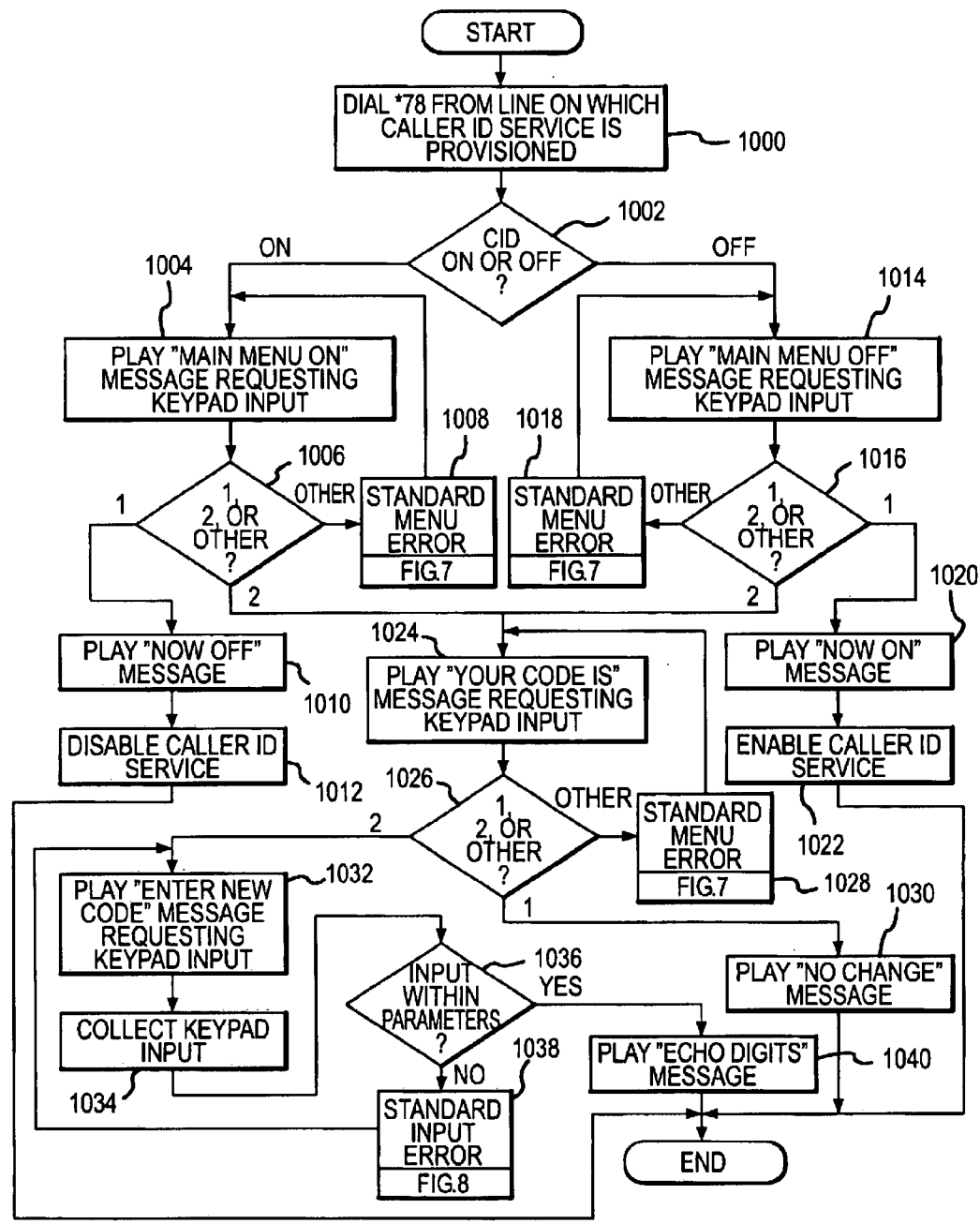
FIG. 10 is a flow chart of the process of changing either the privileged caller code or changing the caller ID service from on to off or from off to on in the caller identification system of the present invention.

FIG. 10 is a flow chart of the process of changing either the privileged caller code or changing the caller ID service from on to off or from off to on in the caller identification system of the present invention. Referring now to FIG. 10, in step 1000 the caller ID subscriber, using a telephone keypad, dials "star seven eight" (*78) from the line on which the caller ID service has been provisioned, and enters a security code. In another embodiment, the caller ID subscriber can dial from any telephone an 800 number, enter in the caller ID subscriber's ten digit telephone number, and a security code. In step 1002 the caller identification system checks to see if the caller ID service for the line is currently turned on or turned off. If step 1002 determines that the caller ID service is currently turned on, then step 1004 plays an audible "Main Menu On" message requesting keypad input over the caller ID subscriber's telephone. For example, the prerecorded message may say "Privacy Plus Main Menu. Privacy Plus is on. To turn Privacy Plus off, press ONE. To change your privileged caller code, press TWO." In step 1006 the caller identification system then determines if a one (1) keypad input, two (2) keypad input, or other keypad input is received from the caller ID subscriber's telephone. If step 1006 determines that a one (1) keypad input is received, then step 1010 plays an audible "Now Off" message over the caller ID subscriber's telephone. For example, the prerecorded message may say "Thank you. Privacy Plus is now off." The caller identification system then disables the caller ID service in step 1012 and process of turning off the caller ID service ends.

If step 1006 determines that a two (2) keypad input is received, then control passes to step 1024. If step 1006 determines that other keypad input besides a one (1) keypad input or a two (2) keypad input is received, then step 1008 calls the process of FIG. 7 for standard menu error processing. After returning from FIG. 7, control returns to step 1004.

If step 1002 determines that the caller ID service is currently turned off, then step 1014 plays an audible "Main Menu Off" message requesting keypad input over the caller ID subscriber's telephone. For example, the prerecorded message may say "Privacy Plus Main Menu. Privacy Plus is off. To turn Privacy Plus on, press ONE. To change your privileged caller code, press TWO." In step 1016 the caller identification system then determines if a one (1) keypad input, two (2) keypad input, or other keypad input is received from the caller ID subscriber's telephone. If step 1016 determines that a one (1) keypad input is received, then step 1020 plays an audible "Now On" message over the caller ID subscriber's telephone. For example, the prerecorded message may say "Thank you. Privacy Plus is now on." The caller identification system then enables the caller ID service in step 1022 and the process of turning on the caller ID service ends.

If step 1016 determines that a two (2) keypad input is received, then control passes to step 1024. If step 1016 determines that other keypad input besides a one (1) keypad input or a two (2) keypad input is received, then step 1018 calls the process of FIG. 7 for standard menu error processing. After returning from FIG. 7, control returns to step 1014.

In step 1024, which is entered from step 1006 or step 1016, an audible "Your Code Is" message requesting keypad input is played over the caller ID subscriber's telephone. For example, the prerecorded message may say "Your privileged caller code is . . . (digits are stated). To keep it, press ONE. To change it, press TWO." In step 1026 the caller identification system then determines if a one (1) keypad input, two (2) keypad input, or other keypad input is received from the caller ID subscriber's telephone. If step 1026 determines that a one (1) keypad input is received, then step 1030 plays an audible "No Change" message over the caller ID subscriber's telephone. For example, the prerecorded message may say "Your privileged caller code will not change." The process of changing the caller ID service then ends.

If step 1026 determines that a two (2) keypad input is received, then step 1032 plays an audible "Enter New Code" message requesting keypad input over the caller ID subscriber's telephone. For example, the prerecorded message may say "Enter a four digit privileged caller code, then press POUND." Step 1034 then collects the keypad input from the caller ID subscriber's telephone. In step 1036 the caller identification system determines in the input collected in step 1034 is within the parameters established for a privileged caller code. If step 1036 determines that the new privileged caller code entered is within the established parameters, then step 1040 plays an audible "Echo Digits" message over the caller ID subscriber's telephone. For example, the prerecorded message may say "Your privileged caller code is . . . (digits entered are stated)." The process of changing the caller ID service then ends.

If step 1036 determines that the new privileged caller code entered is not within the established parameters, then step 1038 calls the process of FIG. 8 for standard input error processing. After returning from FIG. 8, control returns to step 1032.

If step 1026 determines that other keypad input besides a one (1) keypad input or a two (2) keypad input is received, then step 1028 calls the process of FIG. 7 for standard menu error processing. After returning from FIG. 7, control returns to step 1024.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A method for telephone call identification comprising the steps of:
   (a) detecting an incoming telephone call from a call source to a subscriber directory number, wherein said call source has an unknown caller directory number;
   (b) identifying service information associated with said subscriber directory number;
   (c) based on said service information, transmitting a first message to said call source, wherein said first message requests a caller identification input;
   (d) upon receiving said caller identification input from said call source which caller identification input can include a leave voice message input, processing further said incoming telephone call utilizing said caller identification input, wherein said further processing includes displaying a special message and a plurality of symbols on a visual display unit connected to said subscriber telephone and associated with said subscriber directory number, wherein said special message and said plurality of symbols indicates that said incoming telephone call is from said call source having said unknown caller directory number; and
   (e) if said caller identification input is not received, disconnecting said incoming telephone call.

2. A method for telephone call identification according to claim 1 wherein step (b) further comprises querying a database within a services control point to identify said service information associated with said subscriber directory number.

3. A method for telephone call identification according to claim 1 wherein step (a) further comprises the step (a1):
   (a1) determining if said unknown caller directory number is a private directory number or an unknown directory number.

4. A method for telephone call identification according to claim 1 wherein step (c) further comprises the steps (c1) and (c2):
   (c1) determining if a privileged caller code was received during said transmission of said first message to said call source, wherein said privileged caller code indicates that said incoming telephone call is from a privileged caller; and
   (c2) upon receiving said privileged caller code during said transmission of said first message to said call source, performing steps (c2a) and (c2b);
      (c2a) verifying the validity of said privileged caller code for said subscriber directory number; and
      (c2b) upon verifying said validity of said privileged caller code for said subscriber directory number, performing steps (c2b1) through (c2b3);
         (c2b1) outdialing said subscriber directory number;
         (c2b2) ringing a subscriber telephone associated with said subscriber directory number with a distinctive ring; and
         (c2b3) displaying a privileged caller message and a plurality of symbols on a visual display unit connected to said subscriber telephone and associated with said subscriber directory number, wherein said privileged caller message and said plurality of symbols indicates that said privileged caller is calling from said call source having said unknown caller directory number.

5. A method for telephone call identification according to claim 4 further comprising the steps (c3) and (c4):

(c3) determining if a voice messaging service is associated with said subscriber directory number; and (c4) upon determining that said voice messaging service is associated with said subscriber directory number, transmitting a second message to said call source, wherein said second message to said call source requests that a voice message be left and requests a leave voice message input.

6. A method for telephone call identification according to claim 1 wherein step (d1) further comprises the step (d0) performed before step (d1):

(d0) upon receiving said caller identification input in step (d), determining a type of said caller identification input.

7. A method for telephone call identification according to claim 1 further comprising the steps (d3) through (d6):

(d3) if said incoming telephone call to said subscriber telephone is answered, performing step (d4) and not performing steps (d5) and (d6), and if said incoming telephone call to said subscriber telephone is not answered, performing steps (d5) and (d6) and not performing step (d4);

(d4) transmitting a second message to said subscriber telephone, wherein said second message to said subscriber telephone indicates that said incoming telephone call is unidentified and requests an acknowledgment input;

(d5) transmitting a third message to said call source, wherein said third message to said call source indicates said subscriber directory number was not answered; and (d6) disconnecting said incoming telephone call.

8. A method for telephone call identification according to claim 7, wherein step (d4) further comprises the steps (d4a) through (d4d):

(d4a) upon receiving a positive response to said second message from said subscriber telephone through said acknowledgment input, performing steps (d4b) and (d4c) and not step (d4d), and upon receiving a negative response to said second message from said subscriber telephone through said acknowledgment input, performing step (d4d) and not steps (d4b) and (d4c);

(d4b) transmitting said name of said caller recorded in step (d0b) to said subscriber telephone;

(d4c) transmitting a fourth message to said subscriber telephone, wherein said fourth message to said subscriber telephone requests accepting or rejecting said incoming telephone call and requests an accept input or a reject input; and (d4d) connecting said incoming telephone call to a telephone answering device connected to said subscriber telephone.

9. A method for telephone call identification according to claim 8 wherein step (d4c) further comprises the steps (d4c1) through (d4c3):

(d4c1) upon receiving a positive response to said fourth message from said subscriber telephone through said accept input, performing step (d4c2) and not step (d4c3), and upon receiving a negative response to said fourth message from said subscriber telephone through said reject input, performing step (d4c3) and not step (d4c2);

(d4c2) connecting said incoming telephone call to said subscriber telephone; and (d4c3) disconnecting said incoming telephone call from said subscriber telephone.

10. A method for telephone call identification comprising the steps of:

(a) detecting an incoming telephone call from a call source to a subscriber directory number, wherein said call source has an unknown caller directory number;

(a1) determining if said unknown caller directory number is a private directory number or an unknown directory number (b) identifying service information associated with said subscriber directory number;

(c) based on said service information, transmitting a first message to said call source, wherein said first message requests a caller identification input;

(d) upon receiving said caller identification input from said call source, processing further said incoming telephone call utilizing said caller identification input;

(d0) upon receiving said caller identification input in step (d), determining a type of said caller identification input;

(d0a) upon determining in step (d0) that said type of said caller identification input is a record name input, performing step (d0b) and not performing steps (d0c) and (d0d), and upon determining in step (d0) that said type of said caller identification input is a leave voice message input, performing step (d0c) and not performing steps (d0b) and (d0d), and upon determining in step (d0) that said type of said caller identification input is an unblock call input and upon determining in step (a1) that said unknown caller directory number is said private directory number, performing step (d0d) and not performing steps (d0b) and (d0c);

(d0b) recording a name of a caller from said call source;

(d0c) routing said incoming call to a voice messaging service associated with said subscriber directory number; and (d0d) unblocking said private directory number and forwarding said incoming telephone call to said subscriber telephone associated with said subscriber directory number (d1) ringing a subscriber telephone associated with said subscriber directory number with a distinctive ring; and (e) if said caller identification input is not received, disconnecting said incoming telephone call.

11. A method for telephone call identification according to claim 10 wherein step (d0b) further comprises the steps (d0b1) and (d0b2):

(d0b1) placing said incoming telephone call on hold; and (d0b2) outdialing said subscriber directory number.

12. An apparatus for telephone call identification, said apparatus comprising:

a terminating end service switching point within a telephone network which processes incoming telephone calls from a plurality of call sources, wherein said terminating end service switching point identifies said incoming telephone calls which have an unknown caller directory number, and further wherein said terminating end service switching point identifies a subscriber directory number of a subscriber for each of said incoming telephone calls;

a database in communication with said terminating end service switching point, wherein said database contains service information on a plurality of said subscribers served by said terminating end service switching point, each of said plurality of said subscribers having a said subscriber directory number, and further wherein said database processes a query from said terminating end service switching point to determine a caller ID service for at least one subscriber directory number receiving at least one incoming telephone call from at least one call source having said unknown caller directory number; and an intelligent peripheral in communication with said terminating end service switching point and in communication with said at least one call source for said at least one incoming telephone call having said unknown caller directory number, wherein said intelligent peripheral transmits to said at least one call source at least one message requesting caller identification input, and further wherein upon receiving said caller identification input from said at least one call source which caller identification input can include a leave voice message input, processing further said incoming telephone call utilizing said caller identification input, wherein said processing includes at least one of: transmitting a ringing signal which causes a subscriber telephone to ring with a distinctive ring and transmitting a data signal which includes a special message presentable on a display device associated with the subscriber telephone, and if said caller identification input is not received, disconnecting said at least one incoming telephone call.

13. An apparatus for telephone call identification according to claim 12 wherein said caller identification input comprises an unblock call input, wherein upon receiving said unblock call input, said intelligent peripheral connects said at least one incoming telephone call from said at least one call source to said at least one subscriber directory number.

14. An apparatus for telephone call identification according to claim 12 wherein said caller identification input comprises a recorded name of a caller from said call source.

15. An apparatus for telephone call identification according to claim 12 wherein said database is contained within a services control point.

16. An apparatus for telephone call identification according to claim 12, said apparatus further comprising:

a signal transfer point in communication with said terminating end service switching point and said database for transferring said query received from said terminating end service switching point to said database;

an originating end service switching point in communication with said terminating end service switching point and in communication with said at least one call source for transmitting said at least one incoming telephone call from said at least one call source having said unknown caller directory number to said terminating end service switching point; and a remote service switching point in communication with said terminating end service switching point and said intelligent peripheral for transmitting said at least one message received from said intelligent peripheral to said call source.

17. An apparatus for telephone call identification according to claim 16, said apparatus further comprising:

a signaling system network, said signaling system network further comprising a first signaling circuit between said terminating end service switching point and said signal transfer point for transferring said query from said terminating end service switching point to said signal transfer point, and for sending at least one call processing instruction from said signal transfer point to said terminating end service switching point;

a second signaling circuit between said signal transfer point and said database for transferring said query from said signal transfer point to said database and for sending at least one call processing instruction from said database to said signal transfer point; and a plurality of third signaling circuits between said database and said intelligent peripheral for transferring processing instructions from said database to said intelligent peripheral.

18. An apparatus for telephone call identification according to claim 16, said apparatus further comprising:

a first trunk for carrying voice grade communications between said originating end service switching point and said terminating end service switching point;

a second trunk for carrying voice grade communications between said terminating end service switching point and said remote service switching point; and a primary rate ISDN trunk for carrying voice grade communications between said remote service switching point and said intelligent peripheral.

19. An apparatus for telephone call identification according to claim 12, wherein if said subscriber telephone is answered after said distinctive ring, and an accept input is received from said subscriber telephone, said intelligent peripheral plays a recorded name of a caller from said call source for audible output on said subscriber telephone.

20. An apparatus for telephone call identification according to claim 12, said apparatus further comprising:

a voice messaging service associated with said at least one subscriber directory number and in communication with said terminating end service switching point, wherein if said subscriber telephone is answered after said distinctive ring, and a reject input is received from said subscriber telephone, said intelligent peripheral routes said at least one incoming telephone call to said voice messaging service.

21. An apparatus for telephone call identification according to claim 20, said apparatus further comprising:

a telephone answering device connected to said subscriber telephone, wherein if said subscriber telephone is answered after said distinctive ring, and said reject input is received from said subscriber telephone, and said voice messaging service is not associated with said at least one subscriber directory number, said intelligent peripheral routes said at least one incoming telephone call to said telephone answering device.

22. A method for telephone call identification comprising the steps of:

(a) detecting an incoming telephone call from a call source to a subscriber directory number, wherein said call source has an unknown caller directory number;

(b) identifying service information associated with said subscriber directory number;

(c) based on said service information, transmitting a first message to said call source, wherein said first message requests a caller identification input, wherein said step of transmitting further comprises the steps of:
  (c1) determining if a privileged caller code was received during said transmission of said first message to said call source, wherein said privileged caller code indicates that said incoming telephone call is from a privileged caller; and
  (c2) upon receiving said privileged caller code during said transmission of said first message to said call source, performing steps (c2a) and (c2b);
  (c2a) verifying the validity of said privileged caller code for said subscriber directory number; and
  (c2b) upon verifying said validity of said privileged caller code for said subscriber directory number, performing steps (c2b1) through (c2b3);
  (c2b1) outdialing said subscriber directory number;
  (c2b2) ringing a subscriber telephone associated with said subscriber directory number with a distinctive ring; and
  (c2b3) displaying a privileged caller message and a plurality of symbols on a visual display unit connected to said subscriber telephone and associated with said subscriber directory number, wherein said privileged caller message and said plurality of symbols indicates that said privileged caller is calling from said call source having said unknown caller directory number;
(d) upon receiving said caller identification input from said call source which caller identification input can include a leave voice message input, processing further said incoming telephone call utilizing said caller identification input, wherein said further processing includes at least one of: ringing a subscriber telephone associated with said subscriber directory number with a distinctive ring and displaying a special message and a plurality of symbols on a visual display unit connected to said subscriber telephone and associated with said subscriber directory number, wherein said special message and said plurality of symbols indicates that said incoming telephone call is from said call source having said unknown caller directory number; and
(e) if said caller identification input is not received, disconnecting said incoming telephone call.

23. A method for telephone call identification according to claim 22 further comprising the steps (c3) and (c4):
  (c3) determining if a voice messaging service is associated with said subscriber directory number; and
  (c4) upon determining that said voice messaging service is associated with said subscriber directory number, transmitting a second message to said call source, wherein said second message to said call source requests that a voice message be left and requests a leave voice message input.

24. The method for telephone call identification according to claim 22 wherein step (d) further comprises at least one of:
  (d1) ringing a subscriber telephone associated with said subscriber directory number with a distinctive ring; and
  (d2) displaying a special message and a plurality of symbols on a visual display unit connected to said subscriber telephone and associated with said subscriber directory number, wherein said special message and said plurality of symbols indicates that said incoming telephone call is from said call source having said unknown caller directory number.

* * * * *